United States Patent [19]

Hayashi et al.

[11] Patent Number: 5,128,704
[45] Date of Patent: Jul. 7, 1992

[54] CAMERA HAVING INFORMATION OR FUNCTION SETTING DEVICE

[75] Inventors: Naohiko Hayashi; Masayuki Suzuki, both of Kanagawa, Japan

[73] Assignee: Canon Kabushiki Kaisha, Tokyo, Japan

[21] Appl. No.: 766,972

[22] Filed: Sep. 26, 1991

Related U.S. Application Data

[63] Continuation of Ser. No. 415,772, Oct. 2, 1989, abandoned.

[30] Foreign Application Priority Data

Oct. 4, 1988 [JP] Japan .................. 63-251456
Oct. 4, 1988 [JP] Japan .................. 63-251457

[51] Int. Cl.$^5$ ........................... G03B 7/00
[52] U.S. Cl. .................. 354/289.1; 354/486
[58] Field of Search ........... 354/442, 289.1, 289.12, 354/486, 441, 443, 444, 445

[56] References Cited

U.S. PATENT DOCUMENTS

| | | | |
|---|---|---|---|
| 4,367,937 | 1/1983 | Mashimo et al. | 354/173 |
| 4,441,801 | 4/1984 | Mashimo et al. | 354/173.11 |
| 4,616,916 | 10/1986 | Someya et al. | 354/442 |
| 4,816,851 | 3/1989 | Fukahori et al. | 354/173.1 |
| 4,837,596 | 6/1989 | Kawamura | 354/289.1 |
| 4,849,780 | 7/1989 | Amano et al. | 354/289.12 |
| 4,849,783 | 7/1989 | Kiyohara et al. | 354/442 |
| 4,881,092 | 11/1989 | Fukahori et al. | 354/152 |
| 4,887,117 | 12/1989 | Kobayashi | 354/400 |

FOREIGN PATENT DOCUMENTS 53-118021 10/1978 Japan .
53-125824 11/1978 Japan .

*Primary Examiner*—Russell E. Adams
*Assistant Examiner*—Jae Noh
*Attorney, Agent, or Firm*—Fitzpatrick, Cella, Harper & Scinto

[57] ABSTRACT

A camera which is provided with first and second operation members for setting information of different kinds respectively is arranged to have first and second information setting modes. In the first mode, first information is set with the first operation member and second information with the second operation member. In the second mode, the second information is set with the first operation member and the first information with the second operation member. The camera permits selection of the first mode or the second mode as desired.

8 Claims, 18 Drawing Sheets

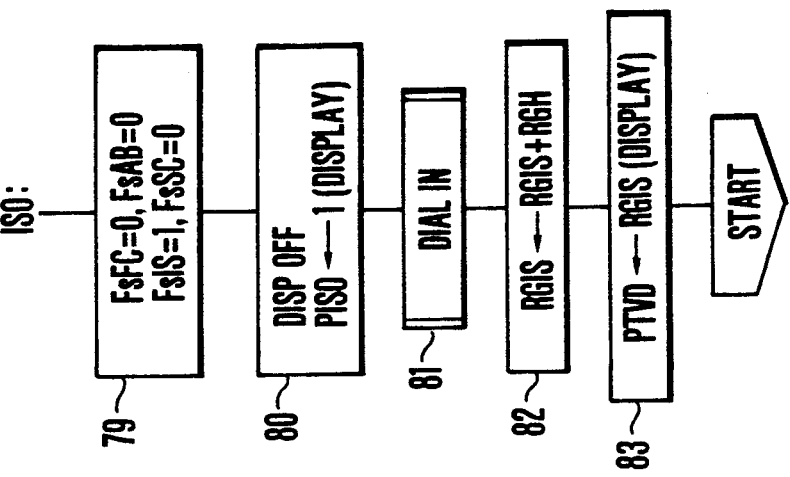
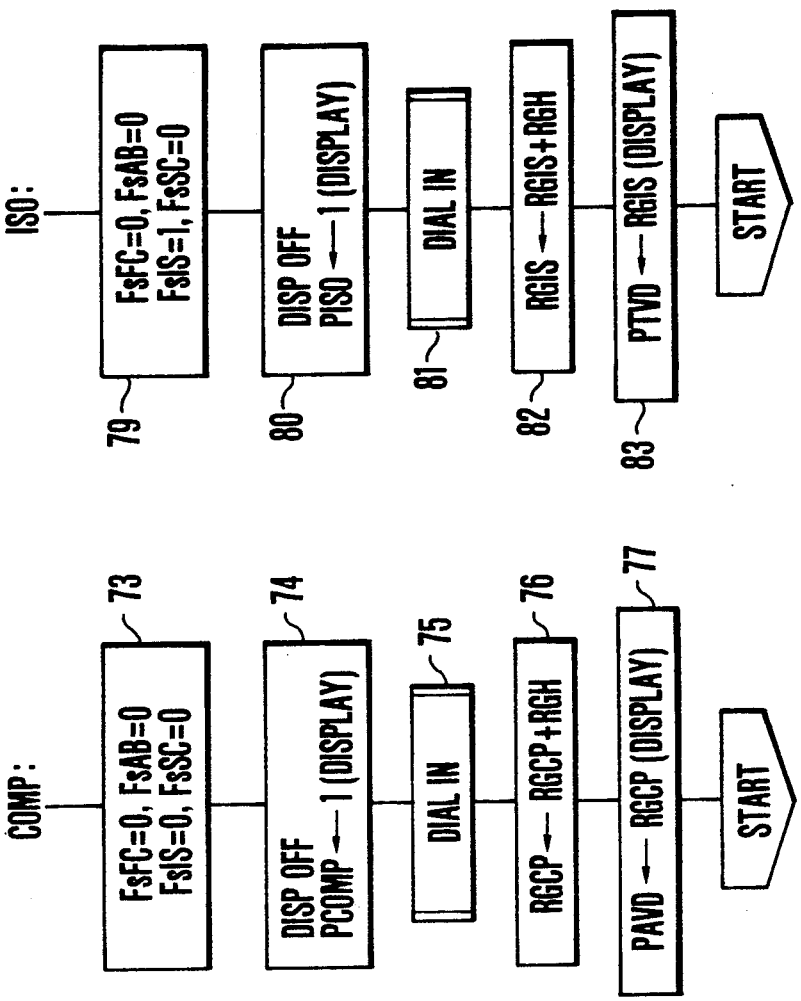
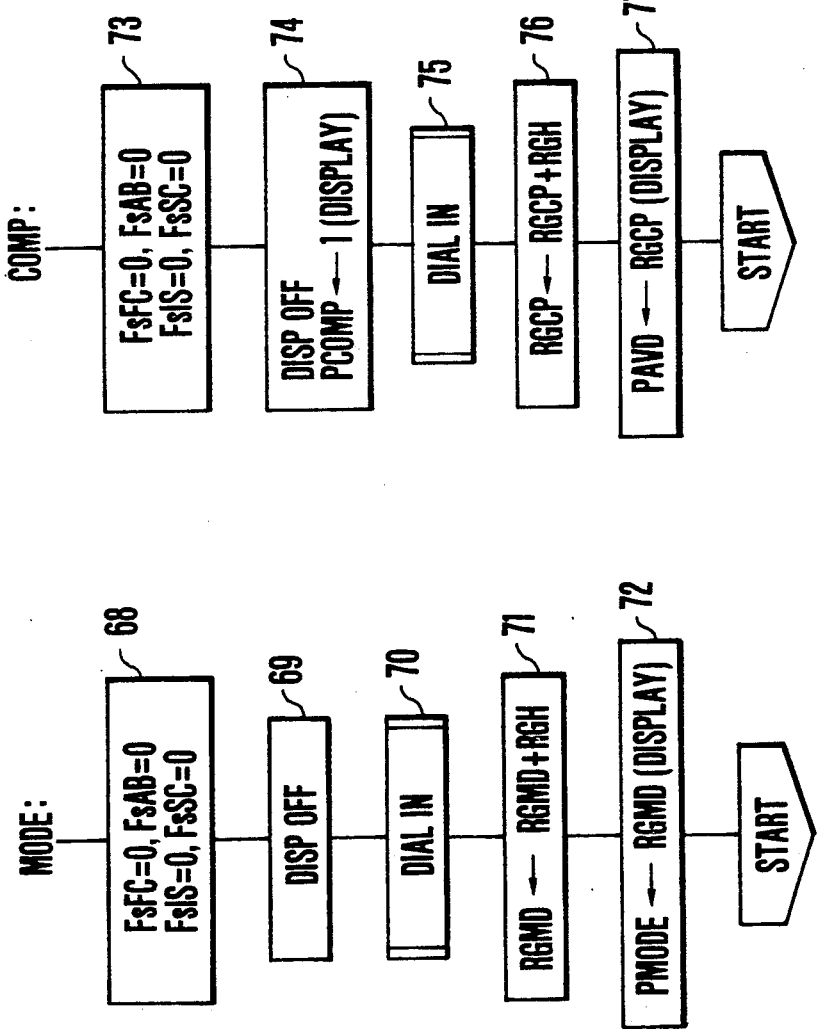

FIG.19

| FLAG | 0 | 1 |
|---|---|---|
| AELKF | AE LOCK BUTTON OFF | AE LOCK BUTTON ON |
| SCF | AF LOCK BY AE LOCK BUTTON | CHANGEOVER BETWEEN SINGLE SHOOTING AND CONTINUOUS SHOOTING BY AE LOCK BUTTON |
| CONTF | SINGLE SHOOTING | CONTINUOUS SHOOTING |

CAMERA HAVING INFORMATION OR FUNCTION SETTING DEVICE

This application is a continuation of application Ser. No. 07/415,772 filed Oct. 2, 1989, now abandoned.

BACKGROUND OF THE INVENTION

1. Field of the Invention

This invention relates to a camera and more particularly to an operation device of the camera.

2. Description of the Related Art

It has been a salient feature of single-lens reflex cameras that the interchangeable lenses of varied kinds can be selectively used as desired by the users. The camera of this kind permits use of, for example, a telephoto lens having a focal length of 300 mm, a wide-angle lens having a focal length of 24 mm or a standard lens of 50 mm focal length. However, the photographing conditions under which each interchangeable lens is to be used are diverse. The functional arrangement of operation members of the camera suitable for the interchangeable lens can hardly be simply and unconditionally determined. Further, the operation member arrangement suited to the linking of the photographers also varies. Arrangement best suited to one person is not always suited for another. For example, in the case of sport photography, telephoto lenses of focal length 300 mm and above are used in most cases. An ultra-telephoto lens of 1200 mm focal length or so is often used. Many objects to be photographed are moving fast. Therefore, sport photography requires use of a lens of relatively small max. open F-number (a bright lens). Such being the requirement, the lenses to be used for sport photography are heavy. Therefore, the left hand of the photographer is used solely for supporting the lens in case that the camera is to be supported by hand. In such a case, the camera is required to enable the photographer to obtain necessary exposure factors, such as a shutter speed and an aperture value, by performing a selecting operation by the right hand of the photographer. If the camera is fixedly set on a tripod, the weight of the camera is carried by the tripod, so that the left hand can be used for operation. In that case, a function of the camera which requires an operation by the left hand and a function which requires an operation by the right hand can be clearly separated from each other, so that the possibility of an erroneous operation can be lessened. Photographing with a standard or wide-angle lens is also performed by operating the camera with two hands in general. However, there are some cases where the camera must be operated only with the right hand as the left hand cannot be used for the camera, like in photographing in a place jammed with people or while riding on a bicycle, a motorcycle or the like. Therefore, a camera arranged to be operated only in a fixed manner hardly meets requirements for varied photographing conditions and the diverse likings of the users.

Further, heretofore, a camera of the kind having single-shooting and continuous-shooting modes has necessitated the following complex operation for change-over between the single-shooting and continuous-shooting modes: The camera is first set in a signal-shooting continuous-shooting selection mode by operating a button. Then, a dial or an up-down switch is operated to select either the single shooting mode or the continuous shooting mode. After that, the camera is brought back to a photographing state either by pushing a shutter release button down to a first stroke position thereof or by means of a timer.

To simplify the complex mode setting operation for a speedy setting operation, a method of turning on a switch provided for a motor drive device of the camera to instantaneously change the single shooting mode over to the continuous shooting mode during a photographing operation has been disclosed in Japanese Laid-Open Patent Application No. SHO 53-125824.

While the conventional mode changing arrangement requires a period of time which is too long to ensure timely capture of shutter chances, the method of changing one mode over to the other by turning on the switch provided for the motor drive device gives a poor operability. Besides, since a switch is to be used solely for the change-over from the single shooting to the continuous shooting, it presents a problem in finding its position on the camera in addition to other operation switches.

SUMMARY OF THE INVENTION

It is one aspect of the invention under the present application to provide a camera or an accessory device thereof having first and second manual operation members in combination with a control circuit which is arranged as follows: In a first mode, first information or a first function can be set by the first operation member and second information or a second function can be set by the second operation member. In a second mode, the second information or the second function can be set by the first operation member and the first information or the first function can be set by the second operation member, the control circuit being arranged to permit selection of the mode thereof.

It is another aspect of the invention to provide a camera or an accessory device thereof having an information setting circuit which is arranged as follows: When the setting circuit is set in a first mode, information of a specific kind is forcedly selected by the operation of an operation member. When the setting circuit is set in a second mode, one of information of a plurality of kinds other than the specific kind can be selectively set by operating the operation member, the setting circuit being arranged to permit selection of the modes thereof.

The objects and features of this invention will become apparent from the following description of embodiments thereof with reference to the accompanying drawings.

BRIEF DESCRIPTION OF THE DRAWINGS

FIG. 10 is a flow chart showing an exposure setting action included in the flow charts of FIGS. 7(a) and 7(b).

FIG. 11 is a flow chart showing an exposure compensation setting action included in the flow charts of FIGS. 7(a) and 7(b).

FIG. 12 is a flow chart showing a film sensitivity setting action included in the flow charts of FIGS. 7(a) and 7(b).

FIG. 19 shows the states of flags included in the flow charts.

DETAILED DESCRIPTION OF THE PREFERRED EMBODIMENTS

Figure 1:
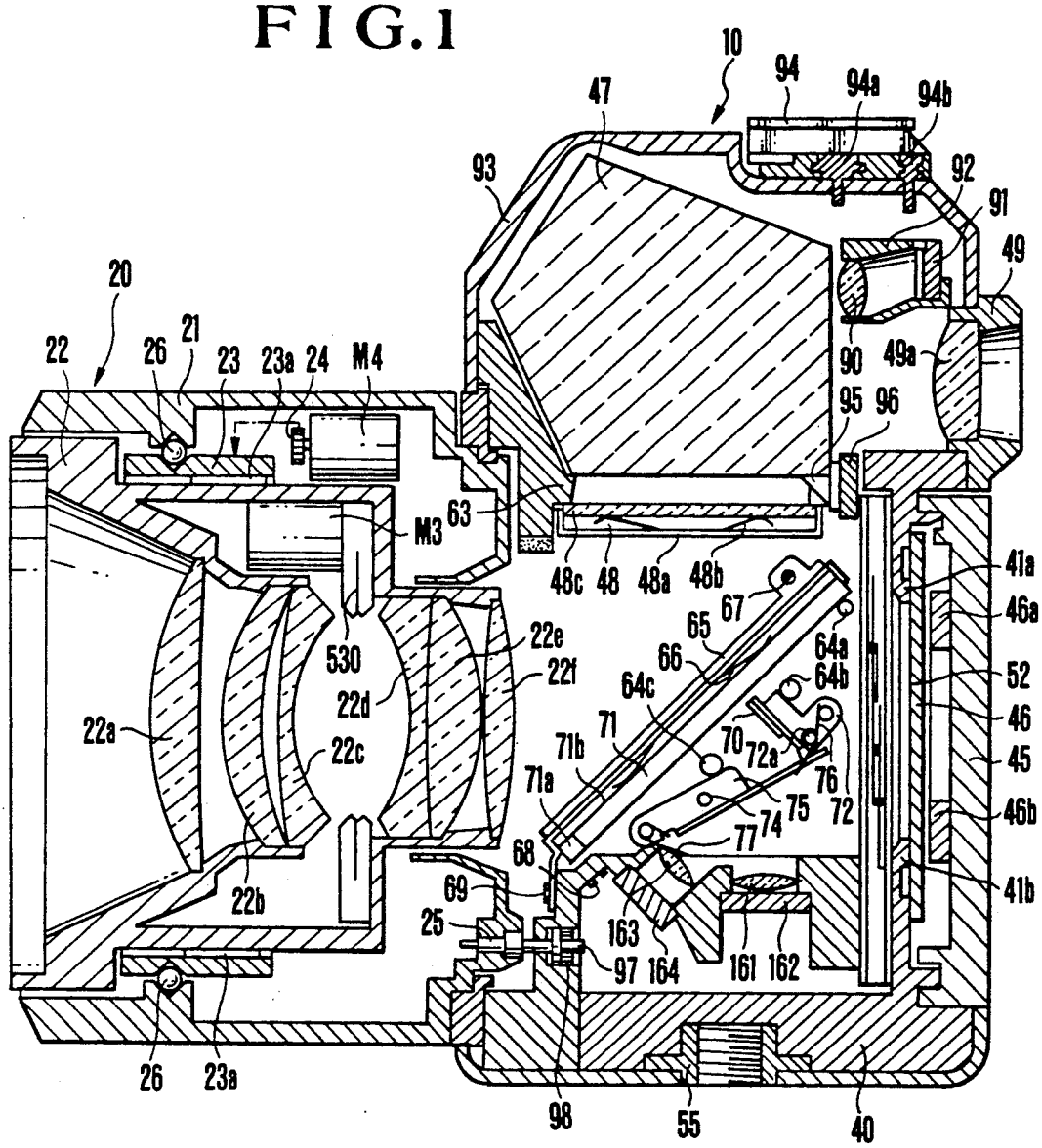
FIG. 1 is a vertical sectional view taken across the middle part of a single-lens reflex camera incorporating an embodiment of this invention.

An embodiment of this invention is arranged as described below with reference to drawings:

FIG. 1 is a sectional view showing the middle part of a camera embodying this invention. A sub-mirror which is a second optical element is in an uplifted state (AF distance measuring position). Referring to FIG. 1, a camera body 40 is provided with upper and lower rail faces 41a and 41b which are arranged to define the positions of a pressing plate 46 and the film. A structural member 63 is formed in one unified body with a mirror box is arranged to define the position of a focusing screen unit 48. The focusing screen unit 48 is provided with the pentagonal prism 47 of a view finder optical system, a focusing screen 48c, a frame body 48a and a spring 48b which is arranged to urge upward the focusing screen 48c. A screw 55 for a tripod is secured to the camera body 40. A back lid 45 is arranged to keep the film shielded from light. Pressing leaf springs 46a and 46b are arranged to push the pressing plate 46 against the rail faces. An eyepiece frame 49 is arranged to have an eyepiece 49a secured thereto. A light measuring lens 90 is arranged to guide light to a photometric sensor 91. An upper cover 93 is arranged to protect the upper part of the camera. A flash device shoe 94 is secured to the upper cover 93. The shoe 94 is provided with a synchronizing contact 94a which is arranged in a known manner; and a signal contact 94b which is arranged for transmission of various signals between the camera and a flash device. While only one signal contact 94b is shown the camera is, in actuality, provided with a plurality of signal contacts 94b. A prism 95 which is for view finder information is arranged below the pentagonal prism 47 to show the contents of a display made by a display element 96 in the lower part of the view finder field when the view finder is sighted through the eyepiece frame 49. A contact 97 is arranged to permit information exchange between the camera body and a lens unit and power supply from the camera body to the lens unit. A spring 98 is arranged to urge the contact 97 toward the lens unit. While only one contact 97 is shown, there are provided a plurality of contacts 97 in the actual arrangement of the camera. A pair of fixed pins 64a are secured to the mirror box on the right and left sides thereof. A half-reflection fixed mirror frame 71a has a thin-film half-reflection mirror 71b stretched on the frame to serve as a light splitting element. The mirror 71b forms a first optical element 71. The first optical element 71 is formed by a vapor deposition process and is arranged to have a light flux which has passed through a photo-taking lens system 22a to 22f split in a given ratio and supplied to the view finder optical system (on the side of the pentagonal prism) and to a photo-taking system (on the side of the film). The light splitting ratio is set, for example, at 60:40. A keep frame body 65 is provided with a spring 66 for urging the first optical element 71 to a given position thereof and is arranged to be swingable on a pin 67 secured to the mirror box. A mirror adjustment screw 68 is provided for adjusting the first optical element 71 to a position which is at a angle of about 45 degree to the optical axis of the lenses. A fixing screw 69 is arranged to have the first optical element 71 urged and fixed by the keep frame body 65. A lens 161 for the AF sensor is arranged to guide a light flux coming from a second optical element 70 to an AF sensor unit 162. A flash light adjustment lens 163 is arranged to guide light, at the time of flash light photography, to a TTL light adjusting sensor 164 which is arranged to measure the reflection light of flash light. A fixed pin 64c is secured to the mirror box and is arranged to restrict, to a given position, a sub-mirror driving plate 75 by the counterclockwise urging force of a sub-mirror driving plate returning spring 77. Another fixed pin 64b which is also secured to the mirror box and is arranged to restrict, to a given position during an AF distance measuring process, the second optical element 70 by the urging force of a sub-mirror urging spring 76 which is arranged to act between a sub-mirror fixing plate 72 and the sub-mirror driving plate 75 to constantly urge the sub-mirror fixing plate 72 in the clockwise direction. A total reflection mirror 70 which is provided for an AF distance measuring purpose as a second optical element is secured to the sub-mirror fixing plate 72 in one unified body therewith. The sub-mirror fixing plate 72 is pivotally carried by a pin 72a to be swingable on the pin relative to the sub-mirror driving plate 75.

A reference numeral 20 denotes a known interchangeable lens unit for AF single-lens reflex camera. The lens unit 20 is provided with an AF-manual change-over mechanism which is arranged between a helicoid member 23 and a pinion gear 24 to effect change-over from automatic focusing (hereinafter referred to AF) to manual focusing to be performed outside the camera. An electric switch is interlocked with the AF-manual change-over mechanism. On the side of the lens unit, there is provided a contact 25 which corresponds to the contact 97 disposed on the side of the camera body. These contacts 25 is arranged to permit communication of information between the camera body and the lens unit and also power supply from the camera body to the lens unit. While only one contact 25 is shown, the lens unit is provided, in actuality, with a plurality of contacts 25. A bearing 26 is provided for the smooth rotation, relative to the helicoid member of a lens carrying body 22 which has photo taking lens system 26a to 26f fixedly attached thereto. The helicoid member 23 has a helicoid 23a and is arranged to have the output of a motor M4 transmitted thereto via a pinion gear 24, a reduction mechanism which is not shown and the AF-manual change-over mechanism. A stepper motor M3 is used as an actuator for an electromagnetic diaphragm mechanism and is arranged to drive and control diaphragm blades 530.

Figure 4:
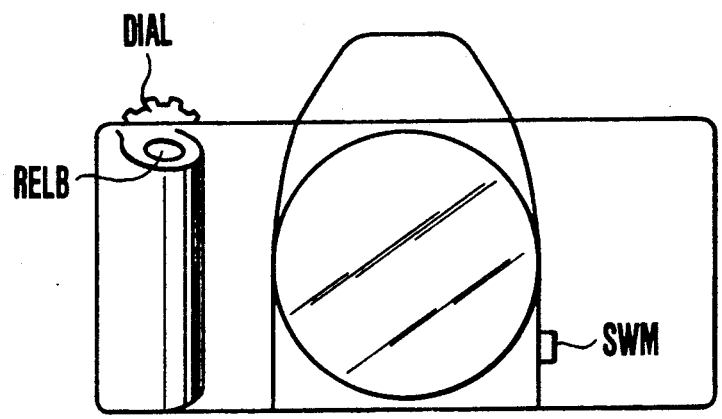
FIG. 4 is a front view of a single-lens reflex camera showing operation members arranged according to this invention.
Figure 5:
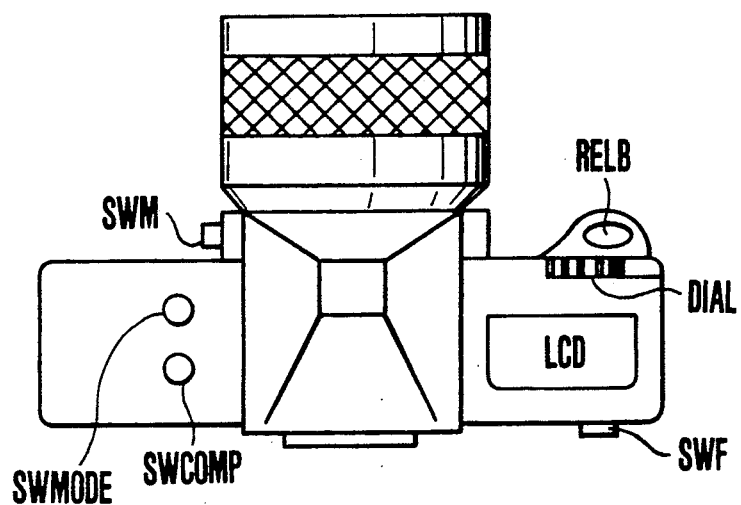
FIG. 5 is a top view of the single-lens reflex camera showing the operation members arranged according to the invention.
Figure 6:
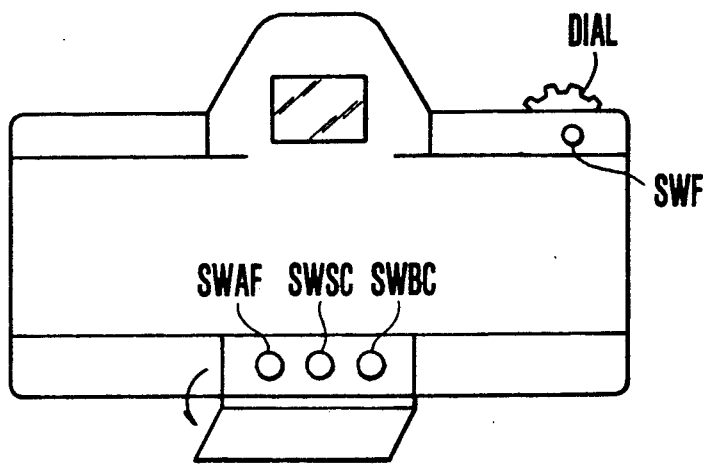
FIG. 6 is a rear elevation of the single-lens reflex camera showing the operation members arranged according to the invention.

FIG. 4 is a front view of the camera incorporating the embodiment of FIG. 1 and shows the arrangement of operation members as viewed from the front. FIG. 5 shows the arrangement of operation members as viewed from above the camera. FIG. 6 shows the arrangement of them as viewed from behind the camera. Referring to these FIGS. 4, 5 and 6, a reference symbol RELB denotes a shutter release button. A symbol DIAL denotes a dial which is arranged to be used in setting a shutter speed, an aperture value, film sensitivity information, an exposure compensation value or information on exposure step in the case of automatic bracketing photographing (for example, the information is obtained every 0.5 step or every one step), etc.. For example, this is an electronic dial consisting of a conductive pattern of two bits differing 90 degrees in phase from each other and a brush. When the dial is turned, the pattern and the brush are scanned relative to each other to produce a pulse.

A switch button SWM is provided for setting an aperture value while switch swapping is not performed. In a manual exposure mode, the aperture value can be changed b operating the above-stated dial DIAL by pushing the aperture setting switch SWM when switch swapping is not performed. Meanwhile, the shutter time can be changed when switch swapping is performed.

A symbol SWMODE denotes a switch button. When the above-stated dial DIAL is operated while pushing this switch button SWMODE, an exposure mode can be selected from among varied modes including a program exposure mode, a Tv priority exposure mode, an Av exposure mode and a manual exposure mode. A symbol SWCOMP denotes a switch button. When the dial DIAL is operated while pushing the switch button SWCOMP, an exposure compensation value can be changed a desired.

The number of frames to be exposed can be set by operating the dial DIAL by simultaneously pushing the switch buttons SWMODE and SWCOMP. A switch button SWSC is arranged to permit selection of a single shooting mode, a continuous shooting mode or a self-timer mode by operating the dial DIAL after pushing this switch button SWSC. A switch button SWAF is arranged to permit changing the film sensitivity information by operating the dial DIAL after pushing the switch button SWAF together with the switch SWBC. A switch button SWSC is arranged to permit setting of the number of steps for automatic bracketing photographing by operating the dial DIAL after pushing the switch button SWSC together with the switch SWAF. A switch button SWF is arranged to permit setting and resetting of switch swapping by pushing this switch button after pushing all the switch buttons SWMODE, SWCOMP and SWSC.

Further, a reference symbol LCD denotes an LCD display device for displaying the exposure mode, the photographing mode, the Tv value, the Av value, the number of photographing frames, etc..

Figure 3:
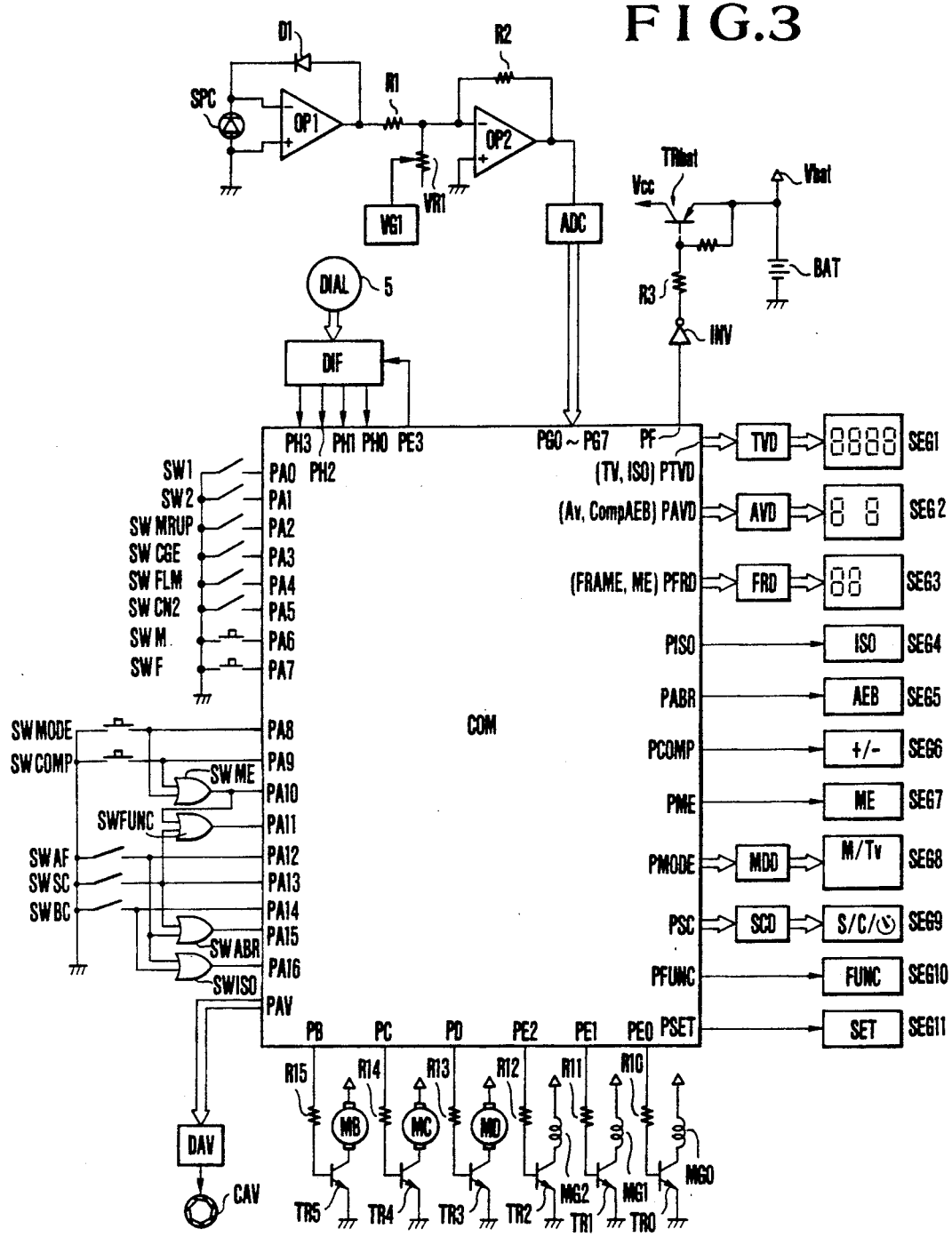
FIG. 3 is a circuit diagram showing an electric circuit including a microcomputer which is arranged to control the operation of the embodiment.

FIG. 3 shows by way of example the arrangement of an electric circuit using a microcomputer COM which is arranged to control a sequence of actions. Referring to FIG. 3, a light receiving element SPC is arranged to receive reflection light from an object to be photographed and to supply a light receiving signal to an operational amplifier OP1, which is of a high input impedance and has a compression diode D1 connected to a feedback circuit thereof. The amplifier OP1 is arranged to produce via a resistor R1 information on the luminance Bv of the object which is logarithmically compressed. A variable resistor VR1 which is connected to a constant voltage source VG1 is arranged to produce a voltage Sv corresponding to the content of a film sensitivity information register RGIS. An operational amplifier OP2 which has a resistor R2 connected to its feedback circuit is arranged to compute and produce measured light information Ev =(Bv +Sv). The measured light information Ev is supplied to an analog-to-digital (A/D) converter ADC to be converted into an eight-bit digital value. The digital data thus obtained is supplied to the input ports PG0 to PG7 of the microcomputer COM.

When the above-stated dial DIAL is operated, a dial interface circuit DIF (a counter) counts a number of clicks thus produced from the dial. The counted value of the circuit DIF is converted into four-bit information and is supplied to the input ports PH0 to PH3 of the microcomputer COM. Information within the dial interface circuit DIF is reset by a pulse signal supplied from the output port PE3 of the microcomputer COM.

When the camera is loaded with a battery BAT, a power supply Vbat is supplied to the microcomputer COM, the decoders TVD, AVD, FRD, MDD, SCD and the dial interface circuit DIF. When a first stroke switch SW1 which is connected to the input port PA0 of the microcomputer COM is turned on, by the first stroke of operation on the above stated shutter release button RELB, the potential level of an output port PF becomes high. This causes a transistor TRbat to be turned on by an inverter INV and a resistor R3. The voltage from the power source Vbat is then supplied as a power supply Vcc to such circuits that consume a relatively large amount of electric energy like the operational amplifiers OP1 and OP2 provided for the purpose of measuring light.

The input ports PA1 to PA16 of the microcomputer COM are connected to a second stroke switch SW2 which is arranged to be turned on by a second stroke of the operation of the release button 1; a mirror up switch SWMRUP which is arranged to turn on when the mirror is uplifted and to turn off when the mirror is lowered; a charge completion detecting switch SWCGE which is arranged to turn on upon completion of a mechanical charging process; a film switch SWFLM which is arranged to turn on every time the process of feeding one frame portion of film comes to an end; a trailing curtain switch SWCN2 which is arranged to turn on upon completion of the travel of a tailing curtain; the above-stated switch SWM which is used for setting an aperture value or a shutter time (speed) value;

the above-stated switch SWF which is used for switch swap setting or resetting; the above-stated exposure mode setting switch SWMODE; the exposure compensation value setting switch SWCOMP; a multiple-exposure frame number setting switch SWME which is arranged to produce an output at a low level when the switches SWMODE and SWCOMP are turned on; a swap setting switch SWFUNC which produces a low level output when the switches SWSC and SWME turn on; the switch SWAF; the photographing mode setting switch SWSC; the switch SWBC; an automatic bracketing step number setting switch SWABR which produces a low level output when the switches SWAF and SWSC turn on; and a film sensitivity information setting switch SWISO which produces a low level output when the above-stated switches SWAF and SWBC turn on.

Output ports PE0, PE1 and PE2 of the microcomputer COM is connected to the bases of transistors TR0, TR1 and TR2 respectively via resistors R10, R11 and R12. The transistors TR0, TR1 and TR2 are arranged to control currents supplied to a first clamp magnet MG0, a leading curtain magnet MG1 which is arranged to allow a leading curtain to travel and a trailing curtain magnet MG2 which is arranged to allow the trailing curtain t travel. Output ports PD, PC and PB are connected to the bases of transistors TR3, TR4 and TR5 via resistors R13, R14 and R15. The transistor TR3 is arranged to control the driving action of a charging motor MD; the transistor TR4 to control the driving action of a film rewinding motor MC; and the transistor TR5 that of a film winding motor MB.

An output port PTVD of the microcomputer COM is arranged to supply the content of a shutter time information register RGTv disposed within the microcomputer. or that of a film sensitivity information register RGIS to a decoder TVD. The decoder TVD then supplies a numerical display signal corresponding to the above-state content of the register to a display device SEG1 which is composed of a liquid crystal, etc. and is connected to the decoder TVD. An output port PAVD is arranged to supply to a decoder AVD the content of each of registers disposed within the microcomputer COM including aperture value information, automatic bracketing step information and exposure compensation information registers RGAv, RGBR and RGCP. The decoder AVD is arranged to produce and supply a numerical display signal corresponding to the content of each of these registers to a display device SEG2 which is composed of a liquid crystal, etc. and is connected to the decoder AVD.

An output port PFRD is arranged to supply a decoder FRD with the content of each of registers disposed within the microcomputer COM including a photographing frame number information register RGFR and a multiple exposure frame number information register RGME. The decoder FRD is arranged to produce and supply a numerical display signal corresponding to the content of each of the above-stated registers to a display device SEG3 which is composed of a liquid crystal, etc. and is connected to the decoder FRD. An output port PISO is arranged to supply a signal of "1" or "0" to a display device SEG4 which is composed of a liquid crystal, etc.. The display device SEG4 is arranged to display a film sensitivity setting mode (such as "ISO") in case that the signal of "1" is received.

An output port PABR is arranged to supply a signal of "1" or "0" to a display device SEG5 which is composed of a liquid crystal, etc.. The display device SEG5 displays an automatic bracketing photographing mark (such as "AEB") in case that the signal of "1" is received. An output port PCOMP is arranged to supply a signal of "1" or "0" to a display device SEG6 which is composed of a liquid crystal, etc.. The display device SEG6 displays an exposure compensation photographing mark (such as "+/−") in case that the signal of "1" is received.

An output port PME is arranged to supply a signal of "1" or "0" to a display device SEG7 which is composed of a liquid crystal, etc.. The display device displays a multiple exposure mark such as "ME" in case that the signal of "1" is received.

An output port PMODE is arranged to supply to a decoder MDD the content of an exposure mode display information register RGMD disposed within the microcomputer COM. The decoder MDD supplies an exposure mode display signal corresponding to the content to a display device SEG8. The display device SEG8 then displays, for example "M", "Tv", "Av", "P" or the like.

An output port PSC is arranged to supply a decoder SCD with the content of a photographing mode display information register RGSC disposed within the microcomputer COM. The decoder SCD then produces a signal for a photographing mode display corresponding to the content of the register RGSC. This signal is supplied to a display device SEG9 which is composed of a liquid crystal, etc. and is connected to the decoder SCD. the display device SEG9 then makes a display, for example, such a mark as "S", "C"or " ↻ ".

An output port PFUNC is arranged to supply a signal of "1" or "0" to a display device SEG10 which is composed of a liquid crystal, etc. The display device SEG10 then displays, a swap switch setting mode, such as "FUNC", when the signal of "1" is received.

An output port PSET is arranged to supply a signal of "1" or "0" to a display device SEG11 which is composed of a liquid crystal, etc.. The display device SEG11 then displays a swap mode, for example, as "SET" in case that the signal of "1" is received.

An output port PAV is arranged to supply the content of an aperture value information register RGAv disposed within the microcomputer COM to an aperture control driving circuit DAV. The aperture control driving circuit DAV then produces information on an actual aperture value by converting the content of the register. The information is then supplied to a driving actuator CAV which is, for example, a stepper motor or the like. This drives the actuator for adequate aperture control.

Figure 7A:
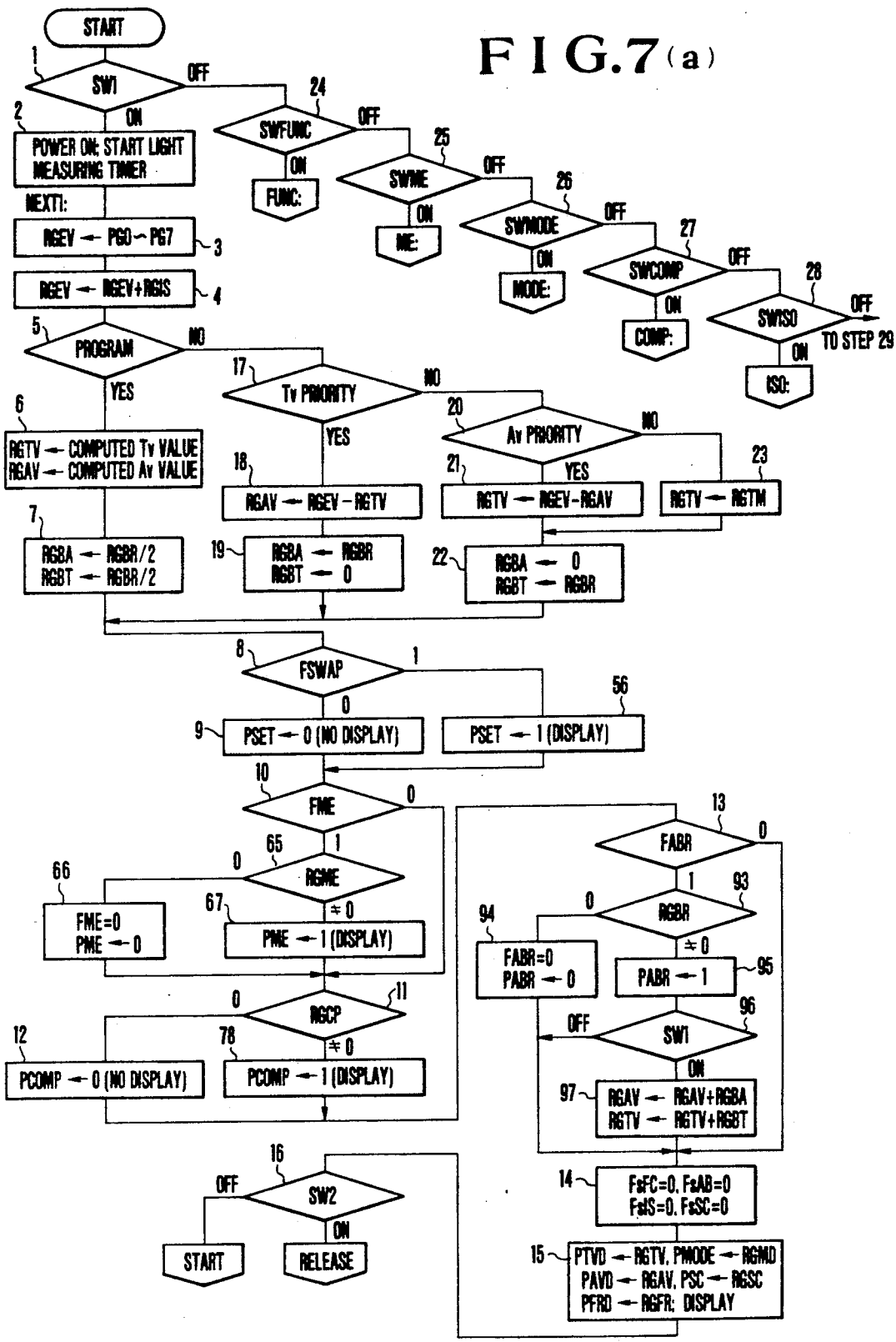
FIGS. 7(a) and 7(b) are flow charts showing the operation of the microcomputer performed prior to a shutter release operation.
Figure 7B:
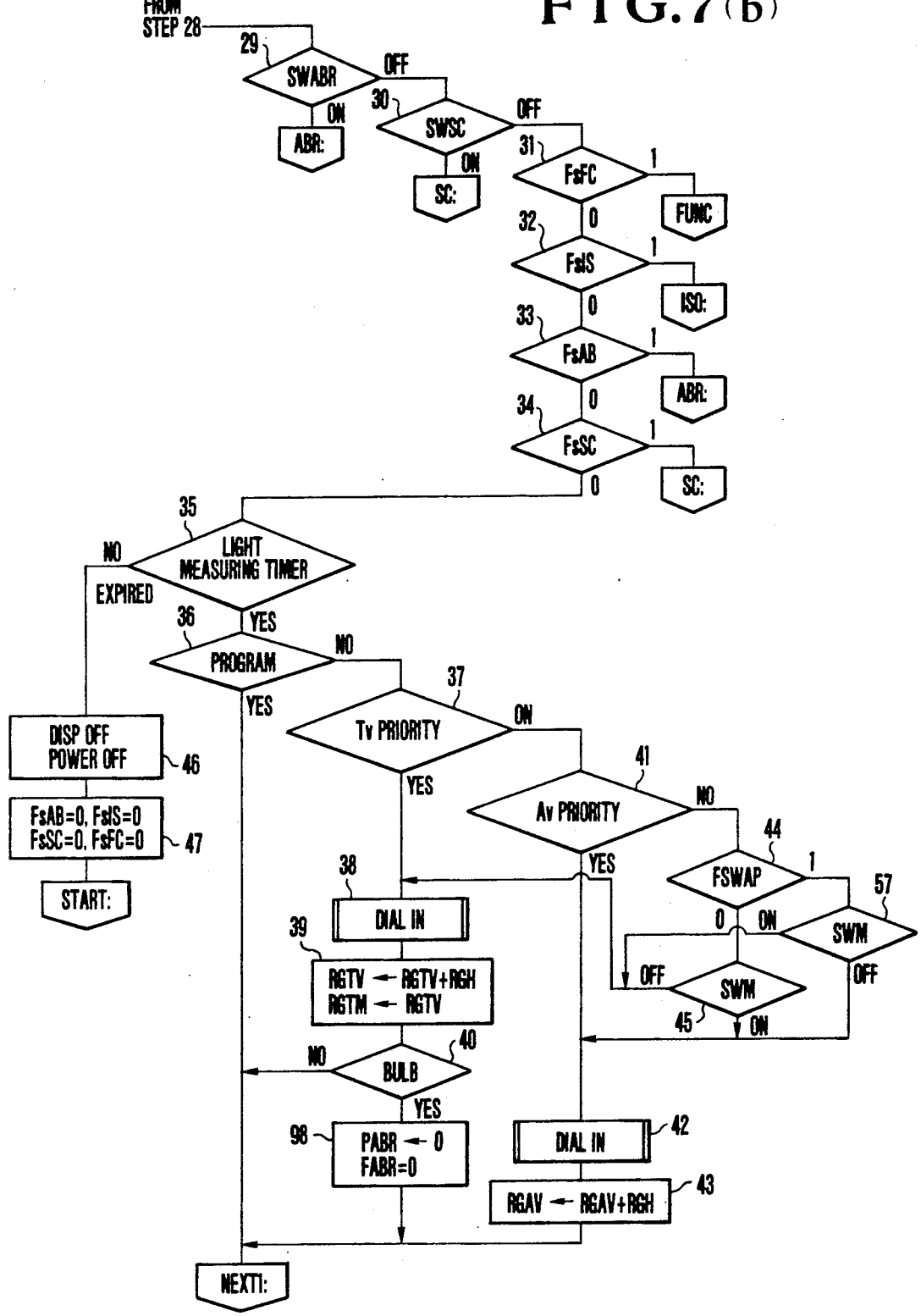

The microcomputer COM is arranged to operate as described below with reference to FIGS. 7(a) and 7(b) to 16(a) and 16(b):

Referring to the flow charts of FIGS. 7(a) and 7(b), with the camera loaded with a battery BAT, all flags within the microcomputer COM are completely cleared by generation of a power supply Vbat. The flow of operation of the microcomputer begins at "START". Sept 1: If the photographer pushes the release button RELB only to the first stroke position thereof, a signal indicating the on-state of the first stroke switch SW1 is supplied to the input port PAO. Then, the flow comes to a step 2. Step 2: The signal of "1" is produced from the output port PF to turn on the transistor TRbat. As a result, the power supply Vcc is supplied to each applicable part. The light measuring timer is started. The light measuring timer is provided for the purpose of allowing the power supply Vcc to be continuously supplied for a given period of time after the first stroke switch SW1 is turned off. The arrangement of the timer allows the photographer to see the light measuring state of the camera for the given period of time after his or her hand is detached from the release button RELB. This enables the photographer to change the setting information while checking the display by operating the dial DIAL. This arrangement can be easily made by means of the hardware timer disposed within the microcomputer COM.

Step 3: Measured light information Ev which has been converted into an eight-bit digital value by the A/D converter ADC is stored by the register RGEv disposed within the microcomputer. Step 4: The content of the register RGIS which stores film information is added to the content of the register RGEv. A sum thus obtained is stored at the register RGEv. Step 5: The content of the register RGMD which stores exposure mode data is read out and checked to see if it indicates a program mode. The register RGMD is arranged to store such data as "0", "1", "2", "3", etc. according to such varied exposure modes as the program mode, the Tv priority mode, the Av priority mode, the manual mode, etc.. If the current content of the register RGMD is found to be "0", thus indicating the program mode, for example, the flow proceeds to a step 6.

Step 6: A programmed computing operation is performed on the basis of the max. open aperture information, the measured light information Ev, etc. according to a given program curve. By this, an aperture value, a shutter speed, etc. are obtained. The computed values thus obtained are stored at the aperture information register RGAV and the shutter speed information register RGTV. Since this program computation is not directly related to this invention, the details of it is omitted from the description. Step 7: One half of the content of the register RGBR storing the automatic bracketing exposure step number information is stored respectively at the aperture bracket step number register RGBT. Step 8: A flag FSWAP which is arranged to indicate whether or not a swap switch mode is set is checked. If the swap switch mode is not set, the flow proceeds to a step 9. Step 9: The output of the output port PSET is set at "0" to put out a swap mode display. Step 10: A flag FME which is arranged to show whether or not the multiple exposure mode is set is checked. If the flag does not show the multiple exposure mode, the flow proceeds to a step 11.

Step 11: The content of the register RGCP which stores the exposure compensation information is read out and checked to see if the exposure compensation mode is set. If the content of the register RGCP is 0, thus indicating that the exposure compensation mode is not set, the flow proceeds to a step 12. Step 12: The output of the output port PCOMP is set at 0 to put out an exposure compensation mode display. Step 13: A flag FABR which is arranged to show whether or not the automatic bracketing mode is set is checked. If not, the flow proceeds to a step 14. Step 14: The flag FsFC which is arranged to show that a swap switch is in the process of being set, a flag FsAB which is arranged to show that automatic bracketing is in the process of being set, a flag FsIS which is arranged to show that a film sensitivity value is in the process of being set and a flag FsSC which is arranged to show that a photographing mode is in the process of being set are cleared. Step 15: The content of the aperture information register RGAv is produced from the output port PAVD, that of the shutter informatio register RGTv from the output port PTVD, that of the photographing frame number information register RGFR from the output port PFRD, that of the exposure mode information register RGMD from the output port PMODE and that of the photographing mode information register RGSC from the output port PSC respectively. As a result, a setting value of aperture is displayed by the display device SEG2, that of shutter time (or speed) by the display device SEG1, that of the number of photographing frames by the display device SEG3, the selected exposure mode by the display device SEG8 and the selected photographing mode by the display device SEG9 respectively.

Step 16: A check is made to see if a signal indicative of an on-state of the second stroke switch SW2 is received at the input port PA1 with the release button RELB operated to the second stroke position thereof. If not, the flow of operation comes back to the start. Then, so long as the signal indicating the on-state of the first stroke switch SW1 is received, this routine is continuously executed to obtain the setting information on the luminance of the object, film sensitivity, the number of photographing frames, the exposure mode and the photographing mode; and to obtain and display the results of a computing operation on the setting information.

If the camera is set in the shutter priority mode, the flow of operation proceeds in the sequence of Step 5 - Step 17 - Step 18.

Step 18: The content of the shutter information register RGTv which stores information set by operating the dial DIAL is substracted from that of the register RGEv and the result of the subtraction is stored at the aperture information register RGAv. The contents of all the registers of the microcomputer COM are arranged to be retained as long as the camera is loaded with the battery BAT. Further, when the battery BAT is initially loaded, information on a value expected to be frequently used, such as 1/125 sec is arranged to be initially set.

Step 19: The content of the register RGBR which stores information on the exposure step number of automatic bracketing is stored at the aperture bracketing step number register RGBA. The content of the shutter bracketing step number register RGBT is set at zero (0).

After this, the sequence of operation in the shutter speed priority mode progresses in the same manner as in the case of the program exposure mode described. The shutter speed value set at the step 15 is displayed by the display device SEG1 and the computed aperture value by the display device SEG2 respectively.

Further, if the camera is set in the aperture priority mode, the flow of operation proceeds in the sequence of Step 5 - Step 17 - Step 20 - Step 21.

Step 21: The content of the register RGAv which stores information set by operating the dial DIAL and the aperture value setting switch SWM is subtracted from that of the register RGEv. The result of this is stored at the shutter information register RGTv. In case that the battery BAT is loaded for the first time, information on a value expected to be frequently used, such as F 5.6, is initially set. Step 22: The content of the bracketing step number register RGBR which stores information on the step number of automatic bracketing exposure is stored at the shutter bracketing step number register RGBT. Meanwhile, the content of the aperture bracketing step number register RGBA is set at zero.

After that, the sequence of operation in the aperture priority mode progresses in the same manner as in the case of the shutter priority mode. The aperture value set at the step 15 is displayed by the display device SEG2 and the computed shutter speed (time) value by the display device SEG1 respectively.

If the camera is set in the manual exposure mode, the flow of operation proceeds in the sequence of Step 17 - Step 20 - Step 23. Step 23: The content of the register RGTM which stores information on a shutter time value set by operating the dial DIAL is stored at the shutter information register RGTv. This step is provided for the purpose of retaining the information set by the dial operation, because: The content of the register RGTv varies at every photographing shot in case that automatic bracketing photographing mode is set in the manual exposure mode. The details of this will be described later. After this, the flow proceeds in the same sequence as in the case of the aperture priority mode. The aperture value set at the step 15 is displayed by the display device SEG2 and the set shutter value by the display device SEG1 respectively.

Next, when information is set by the dial operation while the light measuring (photometric) timer is in action, the microcomputer operates as follows: If the (first stroke) pushing operation on the release button 1 comes to a stop during the sequence of actions described above, a signal indicative of the off-state of the first stroke switch SW1 is received. This causes the flow of program to comes from the step 1 to a step 24.

Step 24: The swap setting switch SWFUNC is checked. If the switch SW1 has been just turned off and no switches have been operated as yet, the flow proceeds to a step 25. Step 25: The multiple exposure setting switch SWME is checked. The flow proceeds to a step 26 like in the case of the step 24. Step 26: The exposure mode setting switch SWMODE is checked. The flow likewise proceeds to a step 27. Step 27: The exposure compensation switch SWCOMP is checked. The flow likewise proceeds to a step 28. Step 28: The film sensitivity setting switch SWISO is checked. The flow likewise proceeds to a step 29. Step 29: A check is made for the position of the automatic bracketing switch SWABR. The flow then likewise proceeds to a step 30. Step 30: A check is made for the position of the photographing mode setting switch SWSC. The flow likewise proceeds to a step 31. Step 31: A check is made for the state of the flag FsFC which is arranged to indicate that the swap switch is being set. Since all the flags have been cleared at the step 14, the flow proceeds to a step 32. Step 32: A check is made for the state of the flag FsIS which is arranged to show that information on the film sensitivity is being set. The flow likewise proceeds to a step 33. Step 33: A check is made for the state of a flag FsAB which is arranged to show that the step number of automatic bracketing is being set. The flow likewise proceeds to a step 34. Step 34: A check is made for the state of the flag FsSC which is arranged to show that the photographing mode is being set. The flow likewise proceeds to a step 35. Step 35: The light measuring timer is checked to see if it is in action. Since the timer has been set to act at the step 2, the flow proceeds to a step 36. Step 36: The content of the register RGMD which is arranged to store information on the exposure mode is checked for the program exposure mode. If the program exposure mode is found to have been selected, the flow proceeds to "NEXT 1" which means the above-stated step 3. After that, the routine from the step 3 is executed in the manner as described in the foregoing.

Figure 15:
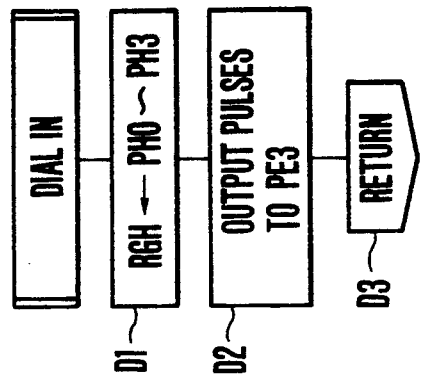
FIG. 15 is a flow chart showing an information setting action included in the flow charts of FIGS. 7(a) and 7(b).

If the shutter speed priority mode is found to have been selected, the flow proceeds in the sequence of steps: Step 36 - Step 37 - Step 38 Step 38: An information reading routine following an operation on the dial DIAL is executed. Referring to FIG. 15, the details of this routine are as described below:

Information Reading Routine

Step D1: Information supplied to the input ports PH0 to PH3 is stored at a register RGH which is provided for the dial. The register RGH then stores a numerical value corresponding to a number of clicks produced from the dial 5 and information as to whether the numerical value is positive or negative according to the rotating direction of the dial 5. In other words, the register RGH stores four-bit information as to how many steps the currently set information is shifted upward or downward. A pulse signal is produced from the output port PE3 to reset the numerical value of the dial interface circuit DIF at zero. Step D3: The flow returns to its initial step to resume the flow of FIGS. 7(*a*) and 7(*b*).

Step 39: The numerical value set by the dial operation (the content of the register RGH) is added to the shutter information (the content of the register RGTv) to renew the shutter information stored by the register RGTv. The renewed content of the shutter information register RGTv is stored at the register RGTM. Step 40: The register RGTM is checked for the presence of a code which represents a bulb exposure mode and is located next to the longest shutter time value. If the bulb exposure mode is not selected, the flow jumps to the step 3 (NEXT 1).

During the operation of the photometric timer after the first stroke pushing operation on the release button 1 comes to a stop, set information can be changed by operating the dial DIAL as described above. After renewal of the set information, the routine from the step 3 is executed to have an aperture value and a shutter time value displayed by the display devices SEG2 and SEG1 at the step 15.

Further, in case that the aperture priority mode is set, the flow proceeds in the sequence of steps: Step 36 - Step 37 - Step 41 - Step 42.

Step 42: A routine of reading information resulting from an operation performed on the dial DIAL is executed like in the case of the step 38. Step 43: The content of the register RGH which is a numerical value newly set by the dial operation is added to the aperture value information stored at the register RGAv to renew the aperture information stored there. In the same manner as in the case of the shutter priority mode, the flow of operation in the aperture priority mode also jumps to the step 3 (NEXT 1), so that the aperture value and the shutter speed value can be displayed by the display devices SEG2 and the SEG1 at the step 15.

In case that the manual exposure mode has been selected, the flow of program proceeds in the sequence of steps: Step 36 - Step 37 - Step 41 - Step 44. Step 44: The flag FSWAP which is arranged to show whether or not switches are swapped. If no swapping is made, the flow proceeds to a step 45. Step 45: A check is made for the state of the aperture-value/shutter-speed value setting switch SWM. The switch SWM is arranged as follows: If no switch swapping is made in the manual exposure mode, the switch SWM permits renewal of a set aperture value by operating the dial along with this switch and that of a set shutter speed value by operating the dial alone. If the switch SWM is found to be in an on-state, therefore, the flow proceeds to execute a routine which is similar to the routine (the step 42) for the aperture priority mode. If the switch SWM is found to be in an off-state, the flow proceeds to execute a routine which is similar to the routine (the step 38) for the shutter speed priority mode.

After the lapse of a given period of time after the end of the release button (REVB) pushing operation, the action of the light measuring timer comes to an end. The flow of program then comes from the step 35 to a step 46. Step 46: The outputs from the output ports PTUD, PAVD, PFRD, PISO, PCOMP, PMODE, PFUNC, PSET, PABR, PME and PSC are set at zero. The displays of all the display devices SEF1 to SEG11 are put out. Further, the output of the output port PF is set at zero to bring the power supply Vcc to a stop by turning off the transistor TRbat. Step 47: Flags FsAB, FsIS, FsSC and FsFC are cleared to zero like in the case of the step 14.

Next, the flow of program jumps to the start. Therefore, after completion of the action of the light measuring timer, the flow is repeatedly executed, in a stand-by mode, in the sequence of steps: Step 1 - Step 24 - Step 25 - Step 26 - Step 27 - Step 28 - Step 29 - Step 30 - Step 31 - Step 32 - Step 33 - Step 34 - Step 35 - Step 46 - Step 47.

Figure 8:
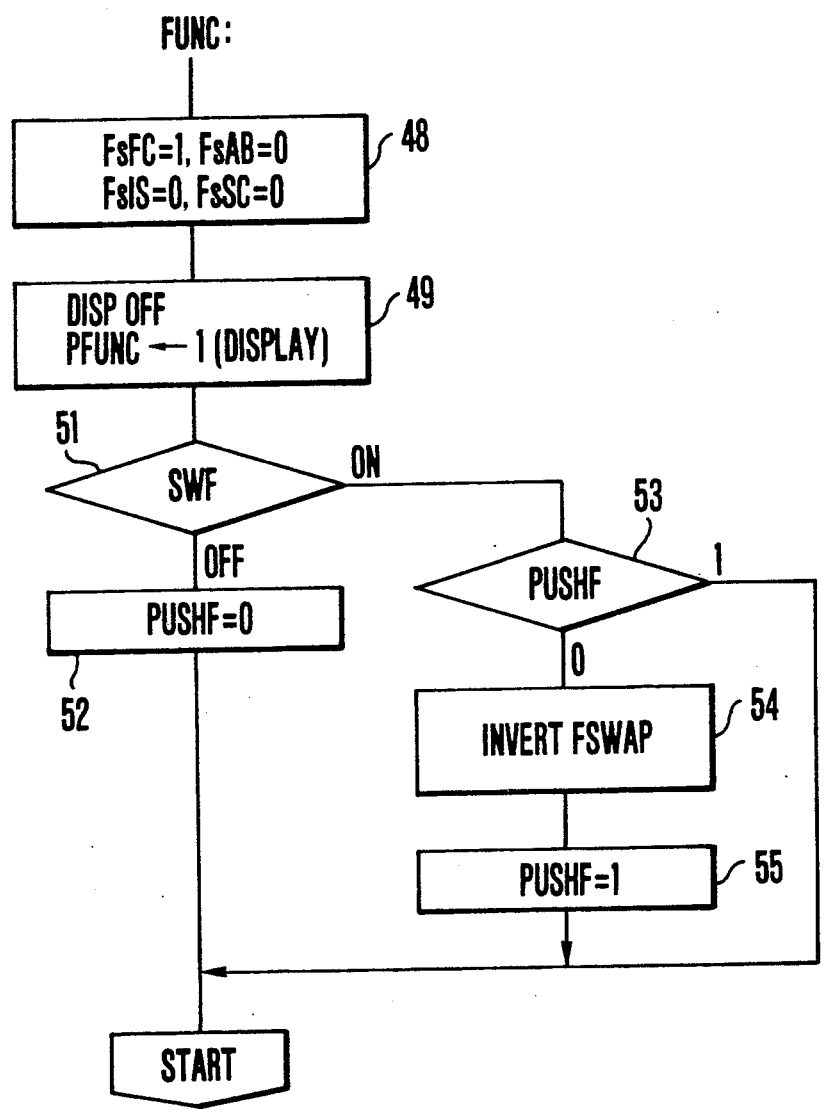
FIG. 8 is a flow chart showing a swap mode setting action included in the flow charts of FIGS. 7(a) and 7(b).

In case that a swap mode is set, the flow of program is as follows: The switch SWFUNC is turned on to produce a low level output when the switches SWMODE, SWCOMP and SWSC are simultaneously turned on. A signal representing the on-state of the switch SWFUNC is supplied to the input port PA11. Then, the flow of program jumps from the step 24 to a routine "FUNC" which is as shown in FIG. 8 and thus comes to a step 48. Step 48: The flag FsFC which is arranged to show that the swap switch is in the process of being set is set at "1". Other flags FsIS, FsAB and FsSC are cleared to zero.

Step 49: All displays are put out in the same manner as at the step 46. Following this, the output of the output port PFUNC is set at "1" to cause the display device SEG10 to light up a display mark, such as "FUNC". This shows the photographer that the swap switch is being set. Step 51: A check is made for the state of the swap change-over switch SWF. If the switch SWF is found to be off, it being immediately after the commencement of the swap setting mode, the flow proceeds to a step 52. Step 52: The flag PUSHF which is arranged to show the on- or off-state of the switch SWF is cleared to zero The flow then jumps to the start.

After the step 52, even if the switch SWFUNC is turned off, the swap setting mode is retained with the flow proceeding in the following sequence of steps as long as the switch SW1 remains off: Step 1 - Step 24 - Step 25 - Step 26 - Step 27 - Step 28 - Step 29 - Step 30 - Step 31 - Step 48 - Step 49 - Step 51 - Step 52.

When the switch SWF is turned on, the flow comes from the step 51 to a step 53. Step 53: A check is made for the state of the flag PUSHF. If the flag PUSHF is in a cleared state, it being immediately after the switch SWF is pushed, the flow proceeds to a step 54. Step 54: A flag which is arranged to show that switch swapping is in process is inverted. At this point of time, it is inverted from 0 to 1. Step 55: The flag PUSHF is set at 1. With the flag PUSHF thus set at 1, the flow proceeds in the above-stated loop of steps: Step 51 - Step 53 - START, even if the switch SWF is continuously pushed. The flag FSWAP is not inverted. The flag FSWAP is repeatedly inverted between 0 and 1 accordingly as the switch SWF is turned on and off.

Next, when the switch SW1 is turned on, the flow proceeds from the step 1 to the step 2 and so on. The flag FsFC is cleared to zero at the step 14. Therefore, the swap setting mode is canceled and the above-stated stand-by state ensues.

If the flag FSWAP is set, the flow comes from the step 8 to a step 56. Step 56: The output of the output port PSET is set at 1 to display, for example, "SET" indicating that the camera is in the swapping mode. This display enables the photographer to know switch swapping even in the stand-by state.

Next, with the switch SW1 turned off, if the camera is in the manual exposure mode, the flow proceeds in the sequence of steps: Step 1 - Step 24 - Step 25 - Step 26 - Step 27 - step 28 - Step 29 - Step 30 - Step 31 - Step 32 - step 33 - Step 34 - Step 35 - Step 36 - Step 37 - Step 41 - Step 44 - Step 57. Step 57: A check is made for the state of the switch SWM. Since the flag FSWAP is set at 1 and the camera is in the switch swapping mode, the switch SWM acts in a manner reverse to the action performed at the step 45. In other words, if the switch SWM is off, the flow proceeds to execute a routine similar to the routine executed in the aperture priority mode (the step 42). If the switch SWM is found to be on, the flow proceeds to execute a routine similar to the routine executed in the shutter priority mode (the step 38).

In case that the multiple exposure mode is set, the flow of program is as follows: When the switches SWMODE and SWCOMP are simultaneously turned on, the multiple exposure switch SWME turns on to produce a low level output. An on-signal indicating the on-state of the switch SWME is supplied to the input port PA10.

Figure 9:
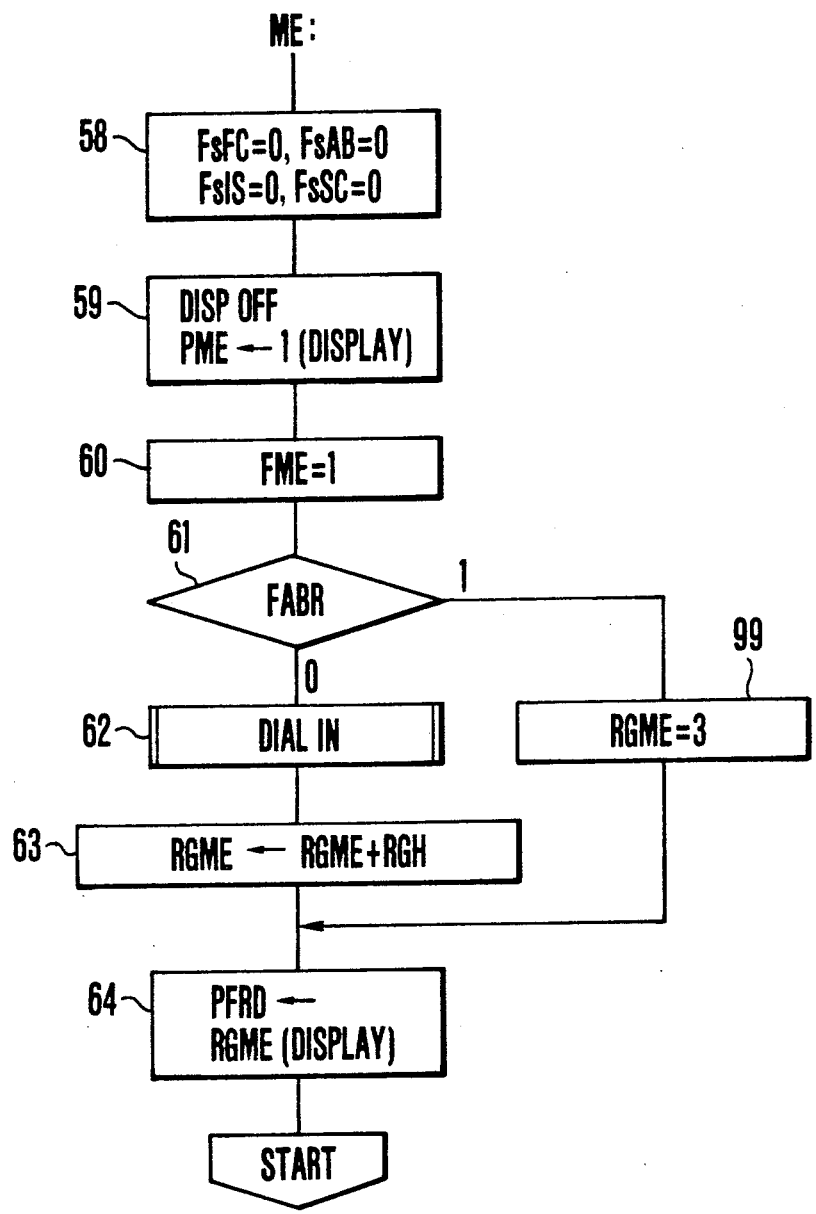
FIG. 9 is a flow chart showing a multiple exposure mode setting action included in the flow charts of FIGS. 7(a) and 7(b).

The flow of program then comes from the step 25 to a routine "ME" which is as shown in FIG. 9.

At a step 58 of FIG. 9: The flags FsFC, FsAB, FsIS and FsSC are all cleared. Step 59: All the displays are put out like at the step 46. Following this, the output of only the output port PME is set at 1 to let the display "ME" of the display device SEG7 light up.

This display enables the photographer to know that the camera is in the multiple exposure mode. Step 60: The flag for showing the multiple exposure mode is set at 1. Step 61: A check is made for the automatic bracketing mode. If the camera is not in the automatic bracketing mode, the flow proceeds to a step 62: The routine of reading information resulting from a dial (DIAL) operation is executed in a manner similar to the step 38 or the step 42. Step 63: The content of the register RGME which is arranged to store the number of times of the multiple exposure is added together with the content of the dial register RGH to have the content renewed and again stored at the register RGME. The number of times for the multiple exposure is an integral number. Therefore, if the resolution of one click of the dial DIAL is 0.5 step, the content of the register RGH for the dial is multiplied by two before it is added. It is also necessary to prevent the content of the register RGH from becoming a negative number. The details of this are omitted from description. In this instance, if the number of frames to be used for multiple exposure is set at five by the dial DIAL, a total of five photographing shots will be made when the shutter release operation is performed once. Step 64: The content of the multiple exposure number register RGME is produced from the output port PFRD to have it displayed by the display device SEG3.

The flow of program then comes back to the start. The number of frames for multiple exposure thus can be set by the dial operation while the switch SWME remain on. However, the flow of program comes back to the above stated stand-by state when the switch SWME is turned off. Such being the arrangement, if the number of multiple exposure frames is set at zero after some multiple exposure frame number has been set, the multiple exposure display must be put out by canceling the multiple exposure mode. Since the flag FME is set at 1 at the step 10 in this program, this mode can be canceled with the flow proceeding to a step 65.

Step 65: If the content of the multiple exposure number register RGME is at zero, the flow proceeds to a step 66. Step 66: The multiple exposure mode indicating flag FEM is reset into 0. Further, the output of the output port PME is set at 0 to put out the multiple exposure display. If the content of the multiple exposure number register RGME is found to be not zero at the step 65, the flow proceeds to a step 67. Step 67: The output of the output port PME is set at 1 to have the multiple exposure mode displayed, because: Since all the displays are put out at the step 46, the photographer must be informed of that the camera is in the multiple exposure mode when the shutter release button RELB is again pushed down to its first stroke position.

In setting an exposure mode, the microcomputer COMP operates as follows: When the exposure mode switch SWMODE is turned on, a signal indicating the on-state of this switch is supplied to the input port PA8. Then, the program jumps from the step 26 to a routine "MODE" which is as shown in FIG. 10. At the step 68 of FIG. 10: Flags FsFC, FsAB, FsIS, FsSC are all cleared. Step 69: All the displays are put out like at the step 46. Step 70: The routine of reading information resulting from a dial operation is executed in the same manner as at the step 62. Step 71: The content of the dial register RGH is added to the content of the exposure mode information register RGMD to let the latter again store the renewed information. Assuming that the register RGMD is arranged to store one of its contents 0, 1, 2 and 3 for the program mode, the shutter priority mode, the aperture priority mode and the manual exposure mode respectively, the content of the register RGMD must be prevented from exceeding 3. However, such arrangement is omitted from description.

Step 72: The content of the exposure mode information register RGMD is produced from the output port PMODE. Then, the decoder MDD produces a signal corresponding to the content of the register RGMD and supplies it to the display device SEG8 to have the exposure mode displayed as applicable. The display informs the photographer of the exposure mode selected. After that, the program comes back to the start. As long as the switch SWMODE is on, the exposure mode can be set by the dial operation. However, the flow of program comes back to the above-stated stand-by state when the switch SWMODE is turned off.

In setting an exposure compensation value, the microcomputer COM operates as follows: When the exposure compensation value setting switch SWCOMP is turned on, a signal indicating the on-state of the switch is supplied to the input port PA9. The program then jumps from the step 27 to a step 73 of a routine "COMP" which is as shown in FIG. 11. Step 73: The flags FsFC, FsAB, FsIS and FsSC are all cleared. Step 74: All the displays are put out like at the step 46. Next, the output of the output port PCOMP is set at "1" to let the display device SEG6 light up a mark such as "+/−" or the like.

Step 75: The routine of reading information resulting from a dial operation is executed in the same manner as at the step 62. Step 76: The content of the dial register RGH is added to the content of the exposure compensation information register RGCP to renew the latter. The renewed information thus obtained is again stored by the register RGCP. As a result, a positive or negative exposure compensation value or a zero exposure compensation value is stored at the register RGCP. Step 77: The content of the register RGCP is supplied from the output port PAVD to the decoder AVD. The decoder AVD then supplies the display device SEG2 with a signal corresponding to the content of the register RGCP. The display device SEG2 then displays the exposure compensation value to let the photographer know the value.

The flow then comes back to the start. An exposure compensation value is thus can be set by dial operation so long as the switch SWCOMP is on. However, the program comes back to the stand-by state mentioned in the foregoing when the switch SWCOMP is turned off.

Assuming that an exposure value which is other than zero is set, the flow of program comes from the step 11 to a step 78. Step 78: The output of the output port PCOMP is produced at 1. As a result, the display device SEG6 displays the exposure compensation mode mark, such as "+/−". This display enables the photographer to know that the camera is in the exposure compensation mode even while the camera is in the stand-by state.

In setting the film sensitivity information, the microcomputer operates as follows: When the switches SWAF and SWBC are simultaneously turned on, the film sensitivity switch SWISO is turned on (to produce a low level output). A signal indicating the on-state of the switch SWISO is supplied to the input port PA16.

The flow of program then jumps from the step 28 to a step 79 of a routine "ISO" which is as shown in FIG. 12. Step 79: The film sensitivity mode flag FsIS is set at 1. Other flags FsSC, FsAB and FsSC are all cleared. Step 80: All the displays are put like at the step 46. After that, the output of the output port PISO is set at 1 to cause thereby the display device SEG4 to light up a mark, such as "ISO". Step 81: The routine of reading information resulting from a dial operation is executed in the same manner as at the step 62. Step 82: The content of the dial register RGH is added to the content of the film sensitivity information register RGIS. Film sensitivity information which is thus renewed is stored again at the register RGIS. Step 83: The content of the film sensitivity information register RGIS is supplied from the output port PTVD to the decoder TVD. The decoder TVD then produces a signal corresponding to the content of the register RGIS. The signal is supplied to the display device SEGl to have the film sensitivity information displayed there. This enables the photographer to know the film sensitivity. After that, the flow of program comes back to the start.

Once the switch SWISO is turned on, the flow comes from the step 32 to the routine "ISO" even if the switch SWISO is turned off after that, because the flag FsIS is set at 1 at the step 79. This permits film sensitivity setting by operating the dial DIAL. The film sensitivity setting mode can be canceled by just pushing the switch SW1. With the switch SW1 thus operated, the flag FsIS is cleared at the step 14. Therefore, the flow of program comes back to the stand-by state.

Figure 13:
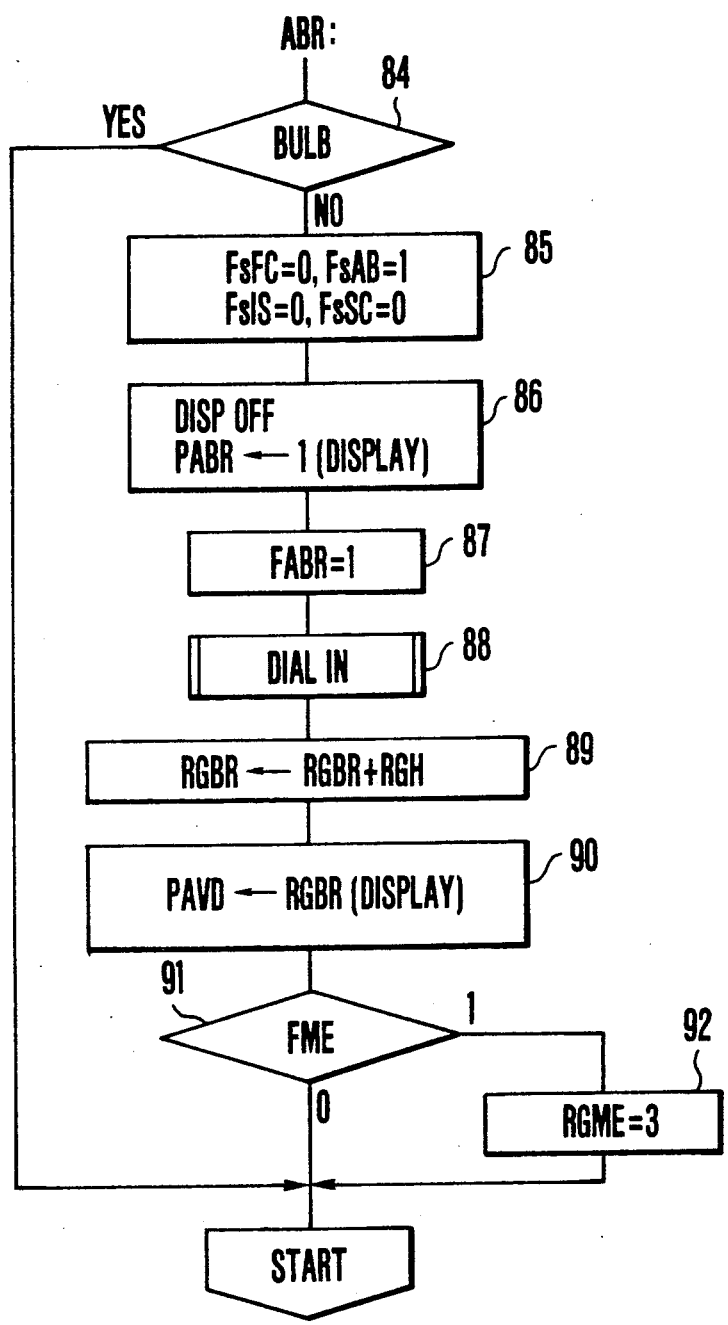
FIG. 13 is a flow chart showing an automatic exposure bracketing information setting action included in the flow charts of FIGS. 7(a) and 7(b).

In setting the automatic bracketing mode, the microcomputer operates as follows: When the switches SWAF and SWSC are simultaneously turned on, the automatic bracketing switch SWABR turns on (to produce a low level output). A signal indicating the on-state of the switch SWABR is supplied to the input port PA15. As a result, the program jumps from the step 29 to a routine "ABR" which is as shown in FIG. 13. At a step 84 of FIG. 13: The content of the register RGTM is checked for the bulb exposure mode. If the content of the register RGTM shows the bulb exposure mode, the flow comes back to the start and the camera never assumes the automatic bracketing mode. If the content of the register RGTM does not show the bulb exposure mode, the flow proceeds to a step 85. Step 85: The flag FsAB which is arranged to show that an automatic bracket is in the process of being set is set at 1. Other flags FsME, FsIS and FsFC are reset to be at 0. Step 86: All the displays are put out like at the step 46. Following that, the output of only the output port PABR is set at 1. This causes the display device SEG5 to light up an automatic bracketing mark, such as "AEB". The display enables the photographer to clearly know that the automatic bracketing mode is being set.

Step 87: The flag FABR which is arranged to show that the automatic bracketing mode is set is set at 1. Step 88: The routine of reading information resulting from a dial (DIAL) operation is executed in the same manner as at the step 38 or 42. In this case, the exposure is automatically changed by steps of "−0.5, 0 and 0.5" if the information is set at a step number of, for example, 0.5, by means of the dial DIAL, or changed by steps of "−1, 0 and 1" if the information is set at a step number of 1. In this instance, photographing is performed according to the predetermined automatic bracketing mode for three frames. More specifically, the photographing according to the step numbers "−0.5, 0 and 0.5" means a continuous shooting at three different exposure values including an exposure value which is for an under exposure as compared with a normally computed exposure value, the normal exposure value and an exposure value which is for an over exposure as compared with the normally computed exposure value.

Step 89: The content of the dial register RGH is added to the content of the bracketing step number register RGBR for renewal of the latter. Renewed information thus obtained is stored again at the register RGBR. As mentioned in the foregoing, by this, the minimum resolution of the dial DIAL as defined by its each click can be set either at 0.5 step or at 1 step as desired. Further, in cases where this resolution differs from those of the shutter time and the aperture value, that problem can be solved by inserting such a program part that multiplies the content of the register RGBR by an integer number. However, since the solution is irrelative to this invention, its details are omitted from description.

Step 90: The content of the register RGBR is produced from the output port PAVD. The output causes the display device SEG2 to display the numerical value of the selected step number which is, for example, "0.5". The decoder AVD and the display device SEG2 which are used in this instance are also used for aperture display and exposure compensation value. The aperture value is decoded and converted from an APEX value Av into an F-number and the exposure compensation value, for example, into a numerical value obtained every 0.5 step. Meanwhile, in the case of automatic bracketing, decoding is to be made also for a numerical value obtained, for example, also every 0.5 step. The decoding value for automatic bracketing, therefore, must be changed. However, assuming that the output from the output port PAVD is produced in six bits, a total of data of 64 different kinds can be sent out. Then, with the aperture value display assumed to be made in one of F-numbers from F 1.4 to F 32 for every 0.5 step, 14 different display values are required for the aperture value display. With the exposure compensation value display assumed to be made in one of values −5 to 5 for every 0.5 step, 21 different values are required for the exposure compensation value display. With the automatic bracketing display assumed to be made in one of values 0 to 5 for every 0.5 step., 11 different values are required for the automatic bracketing display Therefore, a total of 46 or, including blank codes, a total of 48 different values are required. The decoder AVD is enabled to distinguish the kind of data received by adding some constant to the data before sending it from the output port PAVD. Therefore, the display can be made in apposite numerical values.

Step 91: A check is made for the state of the flag which is arranged to show whether the multiple exposure mode is set. If the flag does not show the multiple exposure mode, the flow comes back to the start. If the flag shows the multiple exposure mode, the flow proceeds to a step 92. Step 92: The content of the multiple exposure number register RGME is set at 3, because: The automatic bracketing photographing is predetermined to be performed three times. Therefore, the possibility of any faulty operation by the photographer and any erroneous exposure is prevented by forcedly setting the number of times at three for automatic bracketing. After this, the flow of program comes back to the start. Further, after the signal indicating the on-stat of the switch SWABR is received once, the flow proceeds from the step 33 to the routine "ABR", even if the switch SWABR is turned off, as the flag FsAB is set at 1 at the step 85. After that, therefore, the step number for the automatic bracketing ca be set by operating the dial DIAL. The automatic bracket setting mode can be canceled out by pushing the switch SW1. With the switch SW1 pushed, the flag FsAB is cleared at the step 14. This brings the flow of program back to the stand-by state.

In the automatic bracketing mode, an exposure computing operation is performed as follows: The content of the bracketing step number register RGBR is stored at the bracketing step number register RGBA if the camera is in the shutter speed priority mode, as shown at the step 19, and at the other bracketing step number register RGBT in the event of the aperture priority mode or the manual exposure mode as shown at the step 22. Since the flag FABR is set at 1 in the automatic bracketing mode, the flow proceeds from the step 13 to a step 93.

Step 93: The bracketing step number register RGBR is checked to find if its content is zero. If so, three photographing shots will be made by one and the same exposure (a normal or standard exposure in the case of this embodiment). This is meaningless and must be inhibited. In this instance, therefore, the flow proceeds to a step 94. Step 94: The flag FABR which is arranged to show the automatic bracketing mode is set at zero. Further, the output of the output port PABR is set at "0" to put out the display of an automatic bracketing mark. Following this, the flow comes to a step 14 to execute the normal routine by setting the flag FsAB at 0 without performing computation for the automatic bracketing exposure.

In case that the content of the bracketing step number register RGBR is found to be not zero at the step 93, the exposure computation must be carried out according to the step number information of the register and the automatic bracketing mark must be displayed. Therefore, the flow proceeds to a step 95. Step 95: The output of the output port PABR is set at 1 to have the automatic bracketing mark displayed, because: When the photometric timer is turned off with the switch SW1 turned off, all the display are put out at the step 30. Therefore, the display mark must be lighted up once again when the first stroke switch SW1 is again turned on.

Step 96: A check is made to see if the first stroke switch SW1 is turned on. If so, the flow proceeds to a step 97. Step 97: The content of the aperture information register RGAv and that of the aperture bracketing step number register RGBA are added together. A sum thus obtained is stored again at the register RGAv. Further, the content of the shutter information register RGTv and that of the shutter bracketing step number register RGBT are added together. A sum thus obtained is again stored by the register RGTv. This means that the information on a computed aperture value can be varied according to the automatic bracketing step number in the shutter speed priority mode and that the information on a computed shutter speed can be changed according to the automatic bracketing step number in the aperture priority mode. In other words, with the automatic bracketing step number set at a value which is not a negative value at the time of the step 89, a value obtained by computation performed at the step 97 becomes an under exposure value as compared with a normal exposure value. Further, in the event of the manual exposure mode, the flow comes through a step 22 which is arranged to be the same as in the case of the aperture priority mode. Therefore, the shutter speed is variable while, unlike the conventional camera, the aperture value is not variable. This arrangement permits automatic bracketing photographing with a constant depth of field while only the exposure value is changed from one value over to another.

Further, if the first stroke switch SW1 is found to be in an off-state at the above-stated step 96, it means that the light measuring timer is in action. In that case, therefore, the exposure computation is not performed at the step 97 and the flow comes to the step 15 to have the normal or standard exposure value displayed. Since the release button RELB is pushed through its first stroke position without fail in photographing even in that case, there arises no problems for automatic bracketing photographing as the flow without fail passes the step 97.

In the automatic bracketing mode, as described above, an automatically bracketed exposure value is obtained if the first stroke switch SW1 is turned on. In other words, in the case of this particular embodiment, an exposure value which is on the under-exposure side of the normal exposure value is displayed when the first stroke switch SW1 is on. However, while the light measuring timer is in action, the normal exposure value is displayed. This enables the photographer to readily know an automatic bracketed exposure value.

In case that the bulb exposure mode is set by operating the dial DIAL after the automatic bracketing mode has been set, the microcomputer COM operates as follows: Bracketing is meaningless in the bulb exposure mode in general. The automatic bracketing is preferably canceled in the bulb exposure mode. Therefore, with the camera found to be in the bulb exposure mode at the step 40, the flow proceeds to a step 98. Step 98: The output of the output port PABR is set at "0" to put out the automatic bracketing mark display. Further, the flag FABR which is provided for the automatic bracketing mode is reset into "0".

In setting a multiple exposure number after the automatic bracketing mode has been set, the microcomputer operates as follows: When the camera is found to be in the automatic bracketing mode at the step 61 (FIG. 9), the flow of program proceeds from a step 61 to a step 99. Step 99: Since the camera is in the automatic bracketing mode, the number of times for the multiple exposure is forcedly set at three. More specifically, the content of the multiple exposure number register RGME is set at "3".

Figure 14:
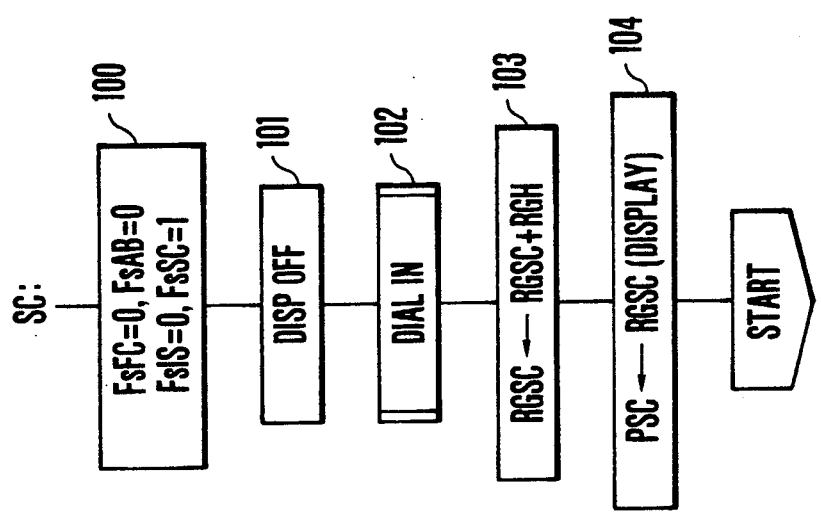
FIG. 14 is a flow chart showing a photographing mode setting action included in the flow charts of FIGS. 7(a) and 7(b).
Figure 16A:
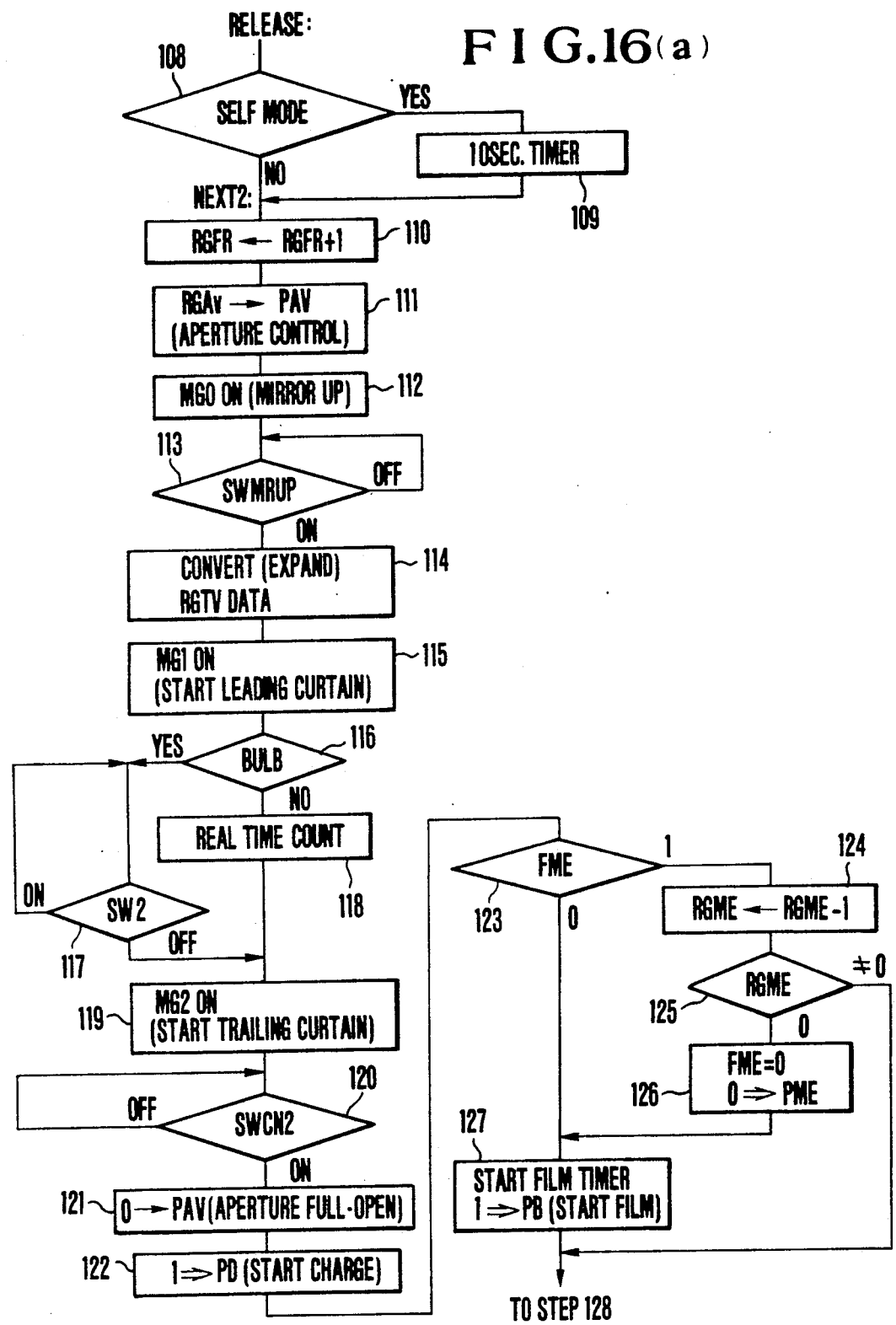
FIGS. 16(a) and 16(b) are flow charts showing the operation of the microcomputer performed after the shutter release operation.
Figure 16B:
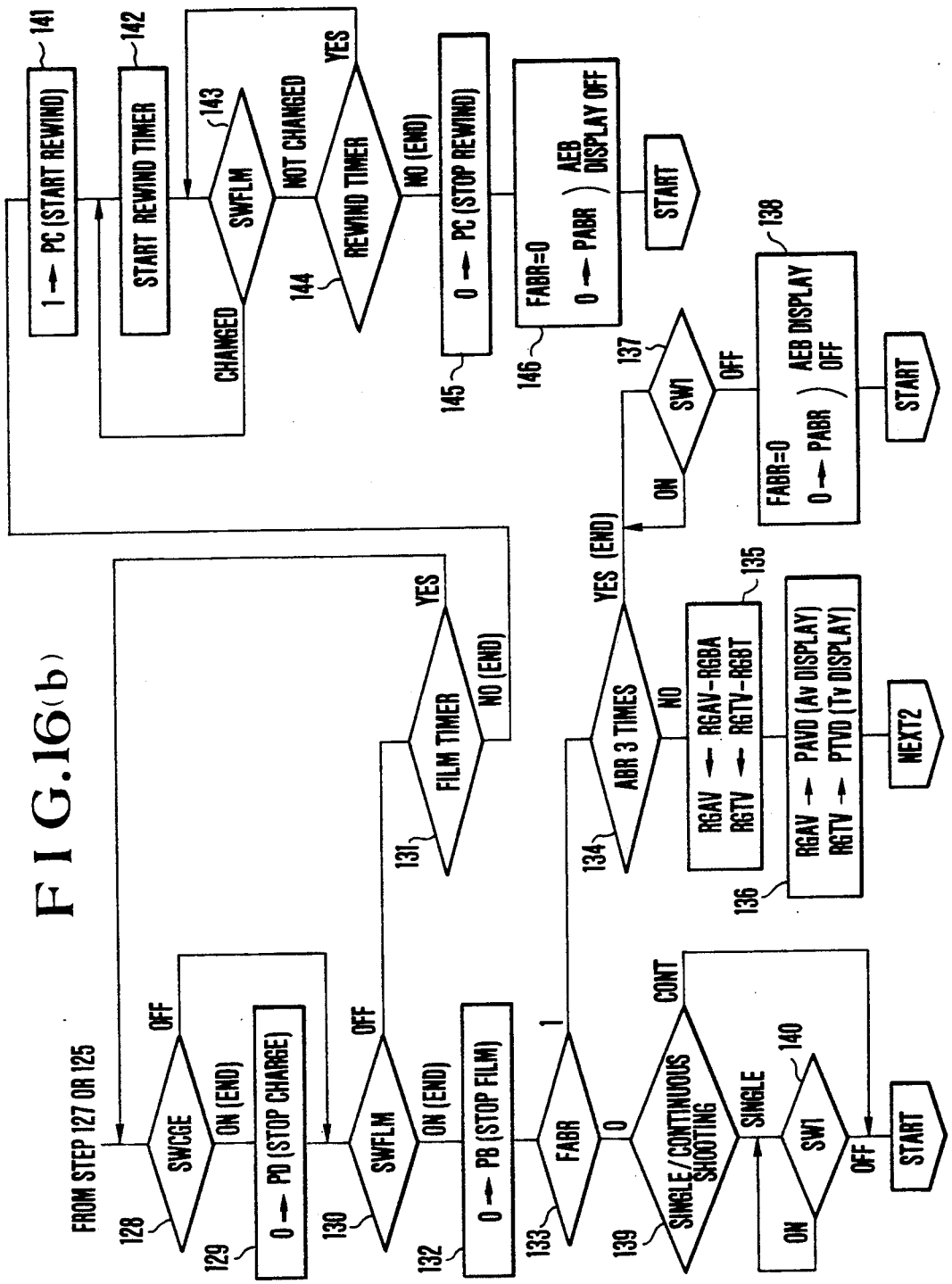

In setting a photographing mode, the microcomputer operates as follows: When the photographing mode setting switch SWSC is turned on with the flow of program in the stand-by state, a signal indicating the on-state of this switch is supplied to the input port PA13. The flow of program then jumps from the step 30 to a routine "SC" which is as shown in FIG. 14. The flow thus comes to a step 100 of FIG. 14. Step 100: The photographing mode setting flag FsSC is set at "1". Other flags FsFC, FsAB and FsME are cleared to "0". Step 101: All the displays are put out like at the step 46. Step 102: The routine of reading the information resulting from a dial (DIAL) operation is executed like at the step 62. Step 103: The content of the photographing mode information register RGSC and that of the dial register RGH are added together. The result of addition is stored again at the register RGSC.

In this instance, if the contents of the register RGSC 0, 1 and 2 are arranged to indicate respectively the single shooting mode, the continuous shooting mode and the self-timer mode, the content of the register RGSC must be arranged not to exceed 2. However, such arrangement is omitted from the following description:

Step 104: The content of the photographing mode information register RGSC is produced from the output port PSC. In response to the output, the decoder SCD supplies a signal corresponding to the content of the register RGSC to the display device SEG9. The display device SEG9 then displays the photographing mode accordingly. This informs the photographer of the photographing mode. The flow of program then comes back to the start.

With the switch SWSC turned on once, the flag FsSC is set at 1 at the step 100. Therefore, even if the switch SWSC is turned off thereafter, the flow comes from the step 34 to the routine "SC". This enables the photographing mode to be set as desired by operating the dial DIAL. The set photographing mode can be canceled by pushing the switch SW1. With the switch SW1 pushed, the flag FsSC is cleared to 0 at the step 14. This brings the flow of program back to the stand-by state.

The preparatory stage of photographing comes to an end through the operation described above.

A sequence of actions ensuing the second stroke of operation of the shutter release button RELB are performed in the following manner: With the second stroke switch SW2 turned on by the second stroke of operation of the release button RELB, a signal indicating the on-state of the switch SW2 (a release signal) is supplied to the input port PA1 of the microcomputer COM. The flow of program then comes from the step 16 of FIG. 7 to a step 108 of FIG. 16. Step 108: The content of the photographing mode register RGSC is read out. If it indicates the self-timer mode, the flow proceeds to a step 109. Step 109: A self-timer is operated to count a period of time 10 sec.. Step 110: A value 1 is added to the number of photographed frames stored. Step 111: The content of the aperture information register RGAv is produced from the output port PAV. Then, the aperture control driving circuit DAV converts the content of the register RGAv into an actual aperture information. The circuit DAV begins to control the diaphragm through the diaphragm driving actuator CAV which is a stepper motor or the like.

Step 112: A pulse signal is produced from the output port PE0. The pulse signal turns the transistor TR0 on to cause a current supply to a mirror uplifting magnet MG0 which is a first clamping combination magnet. This allows the mirror to be uplifted by a known spring force. Step 113: A check is made to see if the input port PA2 has received a signal indicating the on-state of the switch SWMRUP which is arranged to detect completion of the uplifting action on the mirror. In this case, the loop of these steps are repeatedly executed before this signal is received, i.e., until completion of the mirror up-lifting action. Upon completion of the mirror uplifting action, the flow proceeds to Step 114. Step 114: Since the content of the shutter information register RGTv is stored in an APEX value, the content is converted (expanded) into real time data. Step 115: A pulse signal is produced from the output port PE1. This signal turns the transistor TR1 on to have a current supplied to the magnet MG1 which is for the leading shutter curtain. The magnet MG1 then allows the leading curtain to travel.

Step 116: The content of the register RGTM is checked for the bulb exposure mode. If it indicates the bulb exposure mode, the flow proceeds to a step 117. If not, the flow comes to a step 118. Step 117: The flow waits for arrival of an off-signal indicating the off-state of the second stroke switch SW2. Since the camera is in the bulb exposure mode, the step 117 is provided for keeping the shutter open as long as the on-signal indicating the on-state of the second stroke switch SW2 is continuously received. Step 118: Since the camera is not in the bulb exposure mode, the real time is counted according to the data expanded at the step 114. By this, a computed shutter time value is counted. Step 119: Upon completion of the real time count, a pulse signal is produced from the output port PE2. The transistor TR2 is turned on to cause a current supplied to the magnet MG2 which is provided for the trailing curtain of the shutter. The magnet MG2 allows the trailing shutter curtain to travel.

Step 120: A check is made for arrival of the on-signal of the trailing shutter curtain switch SWCN2 at the input port PA5. This loop of step is continuously repeated until arrival of this on-signal, i.e., until completion of the travel of the trailing shutter curtain. Upon completion of the travel, the flow proceeds to a step 121. Step 121: The output of the output port PAV is set at 0. The output causes the diaphragm to be brought back to its maximum open state. Step 122: The output of the output port PD is set at 1. The transistor TR3 is turned on to rotate a motor MD which is provided for bringing the mirror down to its lower position and also for charging the shutter.

Step 123: The flag FME is checked to find if the multiple exposure mode is set. If so, the flow proceeds to a step 124. If not, the flow comes to a step 127. Step 124: The content of the multiple exposure number register RGME is decremented by one. The result of this is again stored by the register RGME. Step 125: The multiple exposure number register RGME is checked to see if its content is zero. If so, the flow proceeds to a step 126. If not it comes to a step 128.

Step 126: When the content of the multiple exposure number register RGME is found to be zero, it indicates that the multiple exposure photographing has come to an end. Therefore, the flag FME which is arranged to show the multiple exposure mode is reset at 0. The output of the output port PME is set at 0 to put out the multiple exposure mark display. Step 127: A film feeding timer is allowed to start. The output of the output port PB is set at "1" to turn on the transistor TR5. As a result, a film feeding motor MB rotates.

If the multiple exposure mode continues, the flow comes from the step 125 to a step 128 as the content of the multiple exposure number register RGME is at zero. Since the flow does not come through the step 127, the film feeding action is not performed in this instance, This allows the film to undergo a multiple exposure. Further, since the content of the register RGME becomes zero upon completion of the multiple exposure, the multiple exposure mode is canceled. After that the film feeding action is performed at the step 127.

Step 128: The input port PA3 is checked for the arrival of a signal indicating the on-state of the charge completion detecting switch SWCGE. If this signal is not received, thus indicating that a charging action has not been completed as yet, the flow comes to a step 30. If the charging action is found to have been completed, the flow proceeds to a step 129.

Step 129: Since the charging action has been completed, the output of the output port PD is set at "0" to cut off a current supply to the charging motor MD.

Step 130: The input port PA4 is checked for arrival of a signal indicating the on-state of the switch SWFLM which is arranged to turn on every time one frame portion of film has been fed. If the input port PA4 has not received the on-signal as yet, thus indicating that the one-frame film feeding has not been completed, the flow proceeds to a step 131. If the one-frame film feeding is found to have been completed, the flow comes to a step 132. Step 131: A check is made for the state of the film feeding timer. If the film comes to its end, film feeding is no longer possible. Then, the above-stated switch SWFLM never turns on. In that event, the film feeding timer which is arranged to be, for example, a one second timer terminates its time count. Upon termination of the time count, the flow comes to a step 141. If the time count has not been terminated, the flow comes back to the step 128 to repeat the above stated sequence of steps, form the Step 128 through the step 130.

Step 132: With the signal indicating the on-state of the switch SWFLM found to have been received, the output of the output port PB is set at "0" to turn off the transistor TR5. This in turn brings the film feeding motor MB to a stop. Step 133: The flag FABR is checked to find if the automatic bracketing mode has been set. If not, the flow comes to a step 139. If so, the flow proceeds to a step 134. Step 134: A check is made to find if the automatic bracketing photographing has been performed three times. As mentioned in the foregoing, in the automatic bracketing photographing mode, three shots of photographing are continuously performed at the three stepwise determined exposure values for under, standard and over exposures. Therefore, the flow proceeds to a step 135 if the three continuous shots have no been made.

Step 135: The content of the aperture bracketing step number register GRBA is subtracted from that o the aperture information register RGAV. The result of subtraction is again stored at the register RGAV. Further, the content of the shutter bracketing step number register RGBT is subtracted from that of the shutter time information register RGTV The result of subtraction is stored again at the register RGTV. Like in the case of the step 97 of FIG. 7(a), one and the same program is usable for each of the program, shutter priority, aperture priority and manual exposure modes, because: The contents of the registers RGBA and RGBT have been changed at the steps 7, 19 and 23. As apparent from the above-stated computing arrangement (subtraction), a normal or standard exposure will be made for the second shot and an over exposure for the third shot.

Step 136: The contents of the registers RGAV and RGTV are produced from the output ports PFD and PTD to have the shutter time information and the aperture value information displayed by the display devices.

Next, the flow of program jumps to "NEXT 2", i.e., a step 110. In other words, the camera enters the process of next shooting irrespectively of the on- or off-state of the second stroke switch SW2 (irrespectively of generation or no generation of the release signal). Further, even if the camera is in the self-timer mode in this instance, the camera proceeds to next photographing without operating the self-timer for the second and third shots.

Step 137: A check is made for receipt of a signal indicating the off-state of the first stroke switch SW1. If the off-signal is found to be not received, the flow of program enables the photographer to see the display of the results of computation performed at the steps 135 and 136. In other words, in this instance, the over exposure value which comes last can be confirmed. Therefore, during the sequence of photographing steps, all the displays of the under-, standard- and over-exposure values in the automatic bracketing photographing mode can be confirmed by seeing the under-exposure value which comes first through the display made at the step 96 described in the foregoing. Upon receipt of the off-signal of the first stroke switch SW1, the flow proceeds to a step 138.

Step 138: The flag FABR which is arranged to show the automatic bracketing mode is reset at 0. The display of the automatic bracketing mode mark is put out by setting the output of the output port PABR at "0." Then, the flow of program comes back to the start to resume the stand-by state.

In case that the camera is not in the automatic bracketing mode, the microcomputer operates as follows: Since the flag FABR is at "0" in this case, the flow comes from the step 133 to a step 139. Step 139: A discrimination is made between the single shooting mode and the continuous shooting mode by reading and checking the content of the photographing mode register RGSC. In the event of the continuous shooting mode, the flow comes back to the start. In this instance, the shutter release button RELB has been operated and signals indicating the on-states of the first- and second-stroke switches SW1 and SW2 have been received. The flow, therefore, enters the next photographing process. If the camera is in the single shooting mode, the flow proceeds to a step 140.

Step 140: The flow waits for arrival of a signal indicating the off-state of the first stroke switch SW1. Since the camera is in the single shooting mode, the flow does not proceeds to the next sequence of photographing actions until the pushing operation on the shutter release button RELB is terminated by the photographer. Upon arrival of the off-signal, the flow comes back to the start.

Next, in case that the film comes to its end during the photographing process, the microcomputer operates as follows: In this case, the time count by the film timer which is a one-second timer as mentioned in the foregoing comes to an end. The flow, therefore, comes from the step 131 to a step 141. Step 141: The output of the output port PC is set at "1" to turn on the transistor TR5. With the transistor TR5 turned on, a film rewinding motor MC is rotated. Film rewinding begins. Step 142: A rewinding timer which is provided for the purpose of detecting the end of a film rewinding action is allowed to start. Step 143: A check is made for a change in the state of the film switch SWFLM. If a change is found in the state of the switch, the flow comes back to the step 142 to have the rewinding timer start once again. If no change is found, the flow proceeds to a step 144. Step 144: A check is made for the termination of the time count of the rewinding timer. If the time count is found not completed, the flow comes back to the step 143. After that, when the film comes to be completely wound up within a film cartridge, the film switch SWFLM ceases to change its state as the rotation of the cartridge comes to an end. Upon detection of this, the flow proceeds to a step 145.

Step 145: The output of the output port PC is set at "0". This brings the rotation of the rewinding motor MC to an end. Then, film rewinding comes to an end. Step 146: The flag FABR which is arranged to show the automatic bracketing mode is reset at "0". The automatic bracketing mark display is put out. The flow then comes back to the start. A series of photographing actions thus comes to an end.

Figure 2:
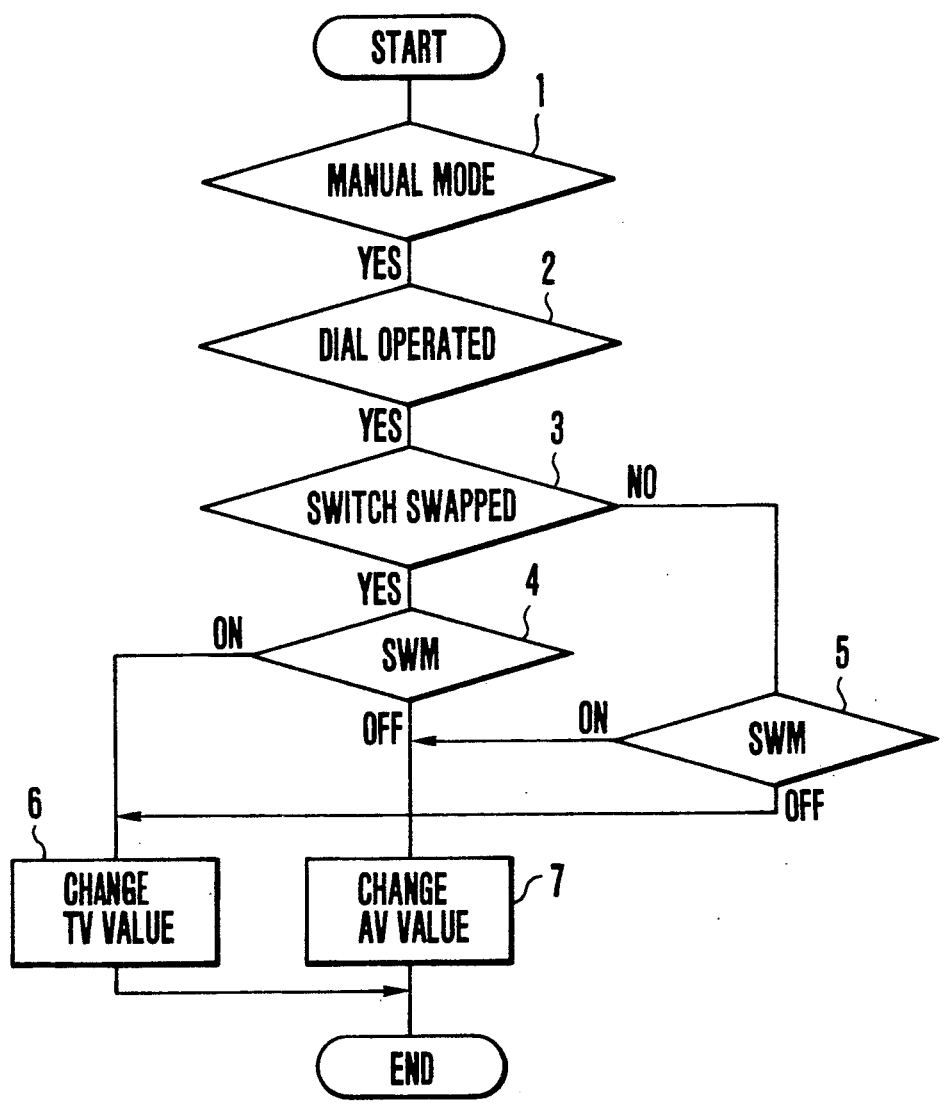
FIG. 2 is a flow chart showing the operation of the essential parts of the embodiment.

As shown at steps 1 to 7 in FIG. 2 which is a flow chart, if the switch swapping mode is not selected with the camera in the manual mode, the shutter time value can be set simply by operating the dial DIAL and the aperture value by pushing down the switch SWM in addition to the operation on the dial DIAL.

In case that the switch swapping mode is set, the aperture value can be set by just operating the dial DIAL and the shutter time value by pushing down the switch SWM in addition to the operation on the dial DIAL. This arrangement enables the photographer to set either the shutter speed or the aperture value as he or she likes.

While the embodiment is arranged to permit swapping for setting the shutter time value Tv or the aperture value Av, the swapping arrangement may be changed to swapping between any other operation members for first and second functions in accordance with this invention.

Figure 17:
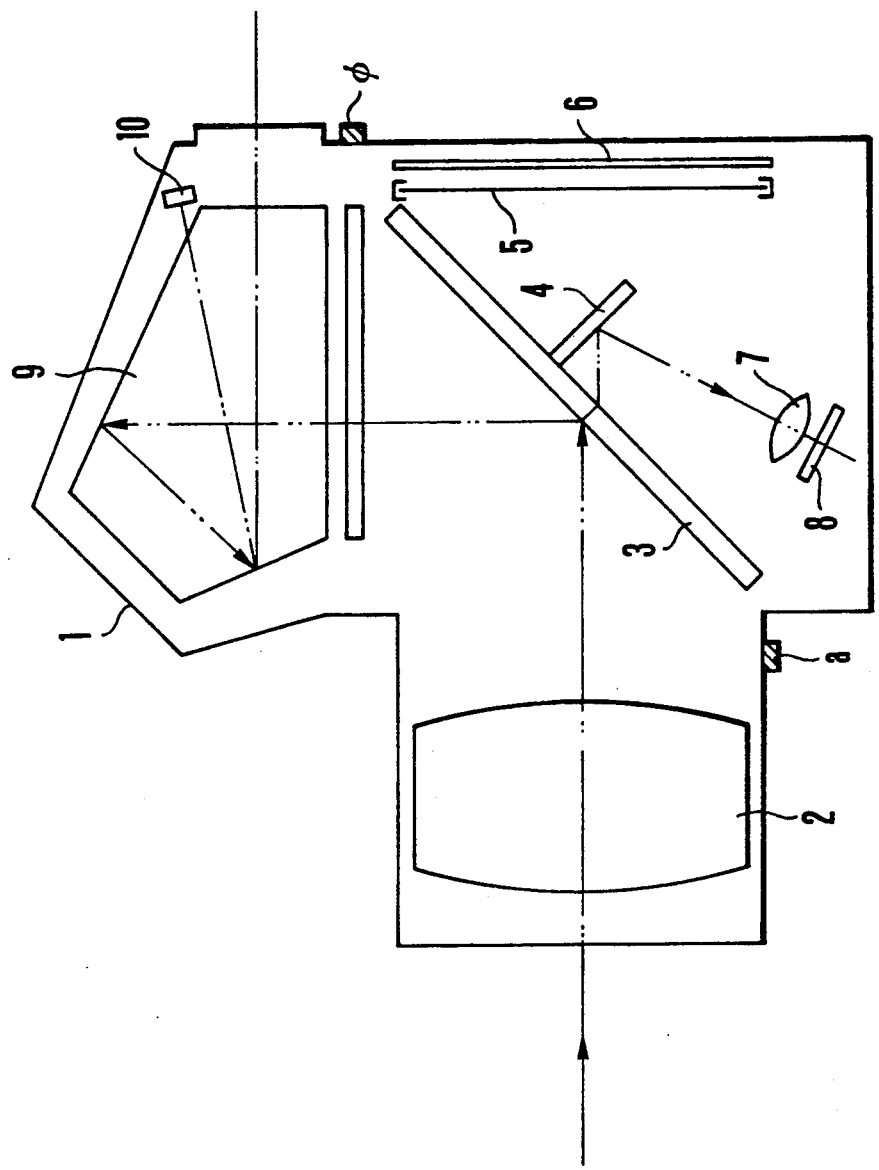
FIG. 17 is a sectional side elevation of a camera body to which this invention is applied.

FIG. 17 shows a camera which is arranged as another embodiment of this invention. Referring to FIG. 17, an AE lock button φ is disposed on the rear right shoulder part of the camera. A stopping-down button "a" is disposed in the lower part of a camera mount. The illustration includes a camera body 1; a photo-taking lens 2; a half-mirror 3; a sub-mirror 4; a shutter 5; a film 6; a distance measuring lens 7; a line sensor 8 which is disposed in a position equivalent to a film surface and is arranged to obtain information on the image of an object to be photographed; a pentagonal prism 9; and a photo-diode 10 which is provided for measuring the luminance of the object.

Figure 18:
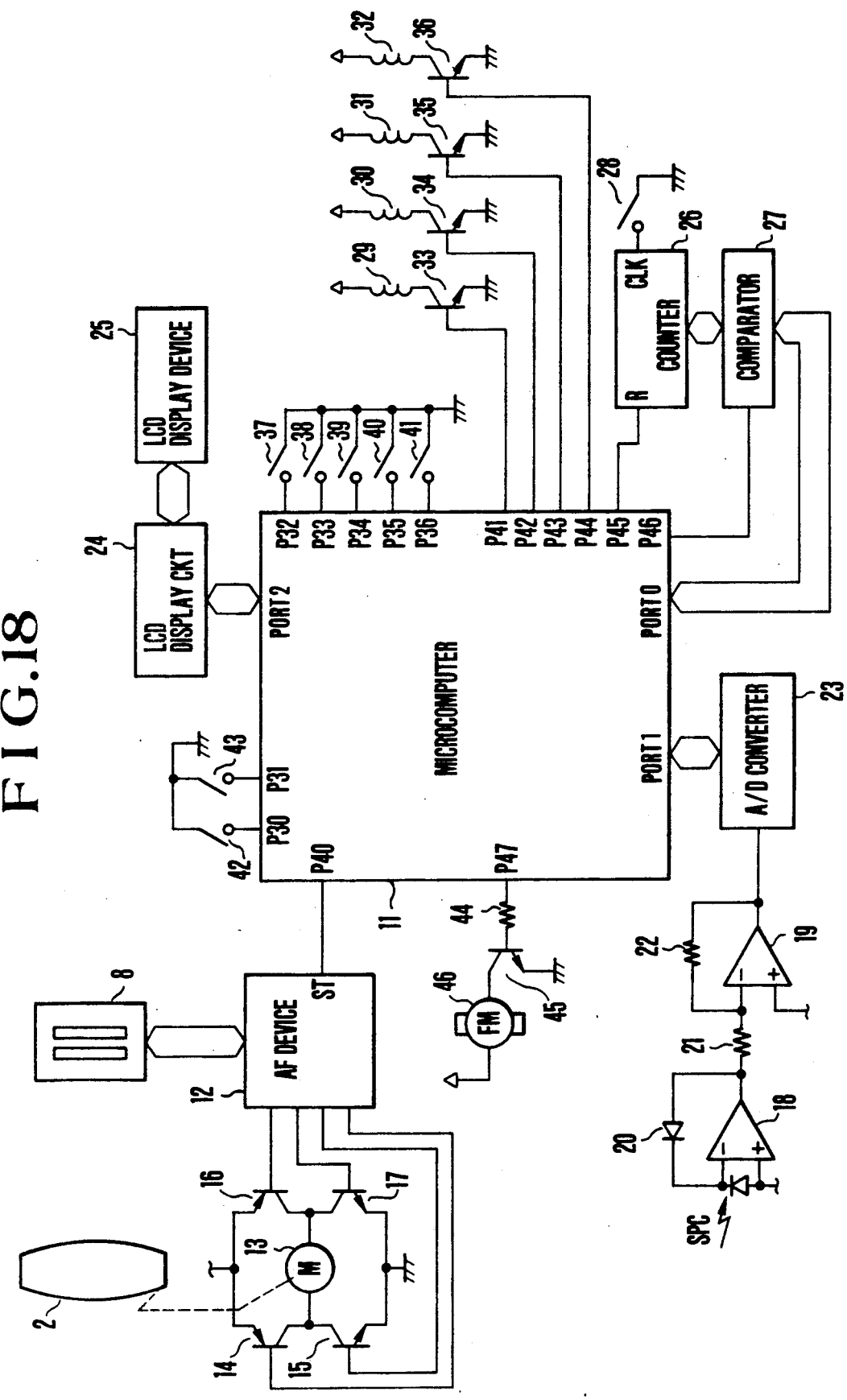
FIG. 18 is a circuit diagram showing an electric circuit incorporated in the camera of FIG. 17.

FIG. 18 shows the arrangement of an electric circuit disposed within the camera of FIG. 17. Referring to FIG. 18, a microcomputer 11 mainly controls the camera. The microcomputer 11 includes an 8-bit input port PORT1; 8-bit output ports PORT2 and PORT0; input ports P30, P31, P32, P33, P34, P35 and P36; and output ports P40, P41, P42, P43, P44, P45 and P47.

The camera comprises a automatic focusing device 12; a motor 13 which is arranged to drive the photo-taking lens 2 for focusing; transistors 14, 15, 16 and 17 which are arranged to drive the motor 13; operational amplifiers 18 and 19; a diode 20 for logarithmic compression; resistors 21 and 22; an A/D converter 23; and a display circuit 24 for making an LCD display in a known manner. The display circuit 24 is arranged to display an aperture value and a shutter time value or to make a digit display of 0 or 1 in accordance with a signal appearing at the port PORT2. The camera further comprises an LCD display device 25; a counter 26 which is arranged to count a clock signal input CLK when a reset input R is pulled down to a low level; a magnitude comparator 27 which is arranged to compare the output of the counter 26 with the output value of the output port PORT0 of the microcomputer 11 and to produce "1" when the two are equal to each other; a switch 28 which is arranged to turn on every time the aperture is stopped down by one step; a magnet 30 which is arranged to control the diaphragm of the camera when a current is supplied to the magnet; a magnet 29 which is arranged to release the camera from a clamped state when a current is supplied to the magnet; a magnet 31 which is arranged to allow the leading curtain of the shutter to travel upon receipt of a current supply; a magnet 32 which is arranged to allow the trailing curtain of the shutter upon receipt of a current supply; transistors 33, 34, 35, 36 and 45; a light measuring switch 37 (hereinafter referred to as a switch SW1) which is arranged to turn on when the shutter release button is operated to its first stroke position; an exposure start switch 38 (hereinafter referred to as a switch SW2) which is arranged to turn on when the release button is operated to its second stroke position; an AE lock switch 39 (hereinafter referred to as a switch SWAE) which is arranged to turn on when the above stated AE lock button φ is pushed; a motor 46 for film feeding; a function setting switch 40 (hereinafter referred to as a switch SWMF); a switch 41 (hereinafter referred to as a switch SWMRUP) which is arranged to turn on when the mirror 3 is uplifted; a switch 42 (hereinafter referred to as a switch SWUP) which is arranged to increment an aperture setting value; and a switch 43 (hereinafter referred to as a switch SWDN) which is arranged to decrement the aperture setting value.

FIG. 19 shows the statuses of flags.

The operation of the camera is as described below with reference to FIGS. 20(a) and 20(b) which are flow charts, wherein: symbols AELKF, UPF, DNF, MEF, SCF, CONTF and SZENF denote flags arranged within the microcomputer 11; and Av, Tv and Ev denote registers arranged to store an aperture value, a shutter speed and the luminance of an object to be photographed respectively. Further, in the following description, the camera is assumed to be ready for photographing with the film having been wound up and ever switch assumed to be in an off-state.

Figure 20A:
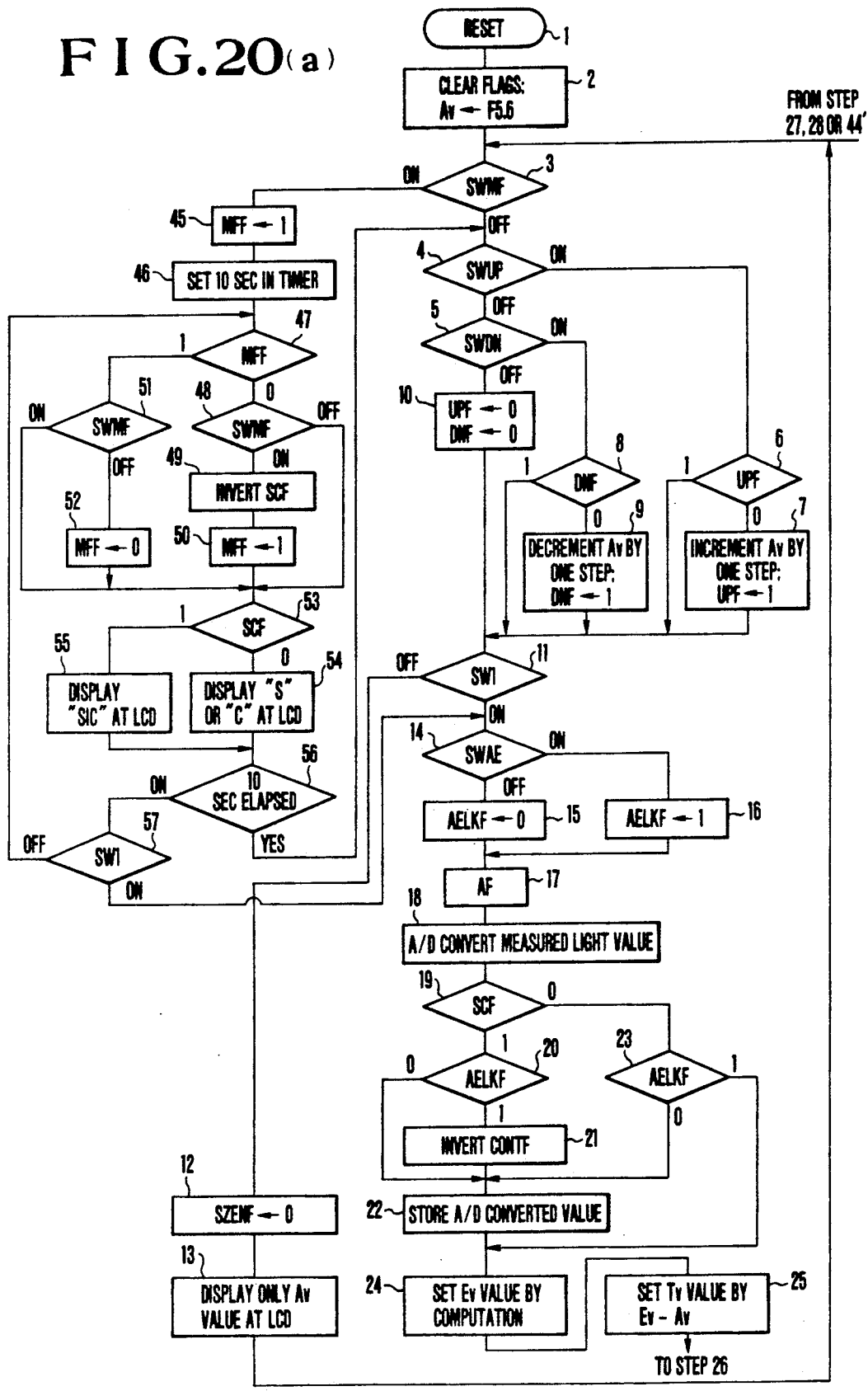
FIGS. 20(a) and 20(b) are flow charts showing the operation of the camera of FIG. 18.
Figure 20B:
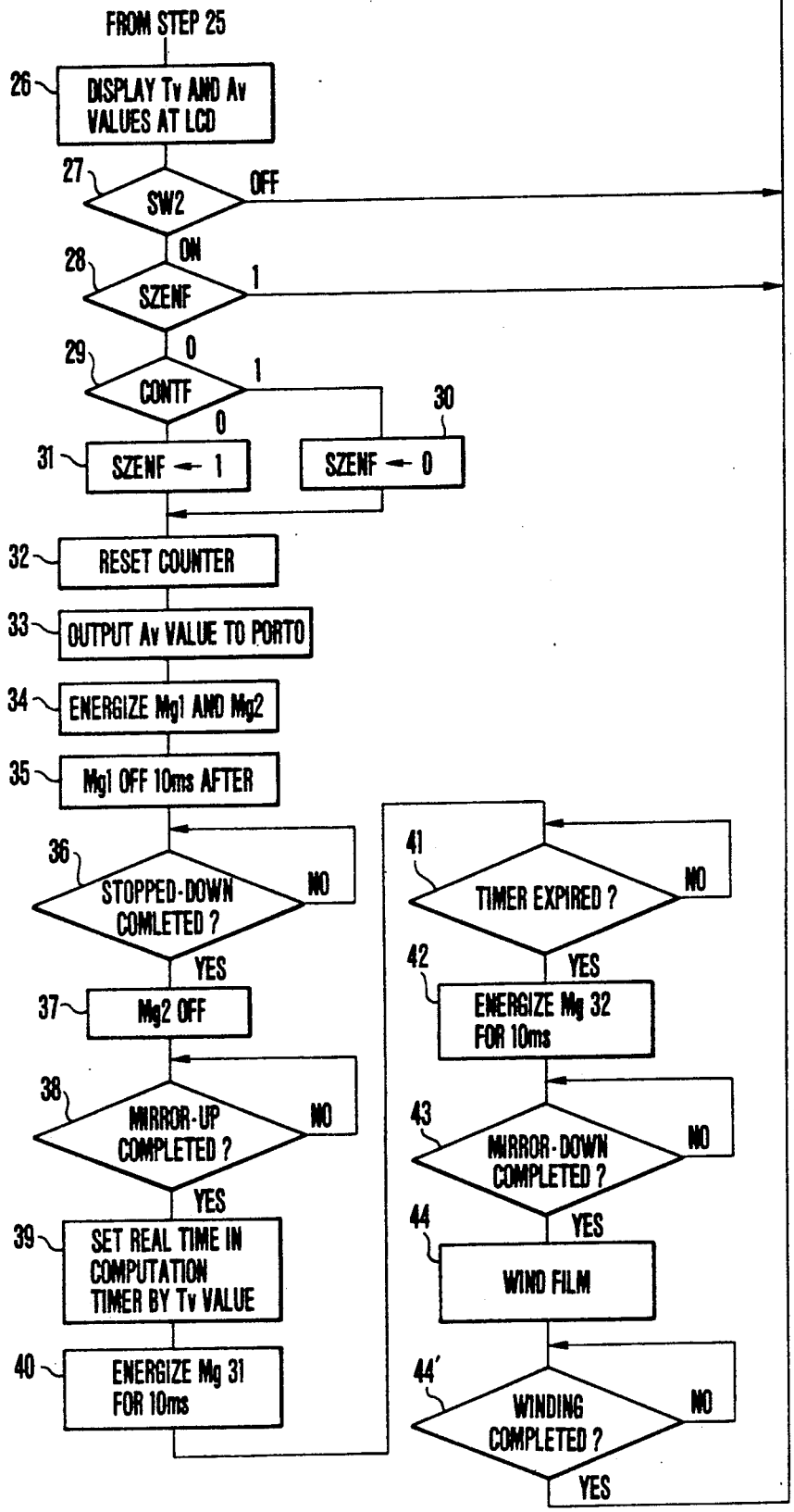

Referring to FIGS. 20(a) and 20(b), when the power supply which is not shown is switched on, the microcomputer 11 (hereinafter will be called the micom 11) begins to perform its control operation from a step 1 "RESET" as follows: Step 1: The camera is reset. Step 2: Each flag is cleared to "0". The aperture is set at F 5.6. The flow of program proceeds to a step 3. Step 3: A check is made for the state of the switch 40 (SWMF). If the switch is on, the flow comes to a step 45. If the switch is off, the flow proceeds to a step 4. Step 4: A check is made for the state of the switch 42 (SWUP). If the switch 42 is on, the flow comes to a step 6. If the switch is off, the flow comes to a step 5. Step 5: A check is made for the state of the switch 43 (SWDN). The flow comes to a step 8 if the switch 43 is on or comes to a step 10 if the switch flag UPF. If the flag UPF is at 0, the flow comes to a step 7. If the flag is at 1, the flow comes to a step 11. The flag UPF stores the state of the switch 42 (SWUP). Step 7: The aperture value is incremented by one step. The flag UPF is set at 1. The flow comes to the step 11. Step 8: The flag DNF is checked. The flow comes to a step 9 if the flag is at 0 or to the step 11 if the flag is at 1. The flag DNF stores the state of the switch 43 (SWDN). Step 9: The aperture value is decremented by one step. The flag DNF is set at 1. The flow comes to the step 11. Step 10: The flags UPF and DNF are cleared to 0.

Step 11: A check is made for the state of the switch 37 (SW1). The flow comes to a step 14 if the switch is found on or comes to a step 12 if the switch is off. Step 12: The flag SZNF is cleared to 0. The flow proceeds to a step 13. Step 13: The aperture value Av is alone displayed by the LCD display device. Then, the flow comes back to the step 3. If none of the switches are found to be in their on-states through these steps, the steps are repeatedly executed in the sequence of Step 3 - Step 4 - Step 5 - Step 5 - Step 10 - Step 11 - Step 12 - Step 13 - Step 3. During this loop process, the aperture value F 5.6 is kept displayed alone. Further, if the switch 42 (SWUP) is turned on and off during the above-stated process, the aperture value Av is incremented by one step every time the switch is turned on and off. If the switch 43 (SWDN) is operated during this process, the aperture value is decremented by one step every time the switch 43 is turned on and off. The aperture value is thus adjustable as desired. During the step repeating process, if the release button is pushed to its first stroke position to turn on the switch 37 (SW1), the flow of program comes to a step 14.

Step 14: A check is made for the state of the switch 39 (SWAE). If the switch is found in its on-state with the AE lock button φ pushed, the flow comes to a step 16. If not, the flow proceeds to a step 15. Step 15: The flag AELKF is cleared to 0. The flow comes to a step 17.

Step 16: The flag AELKF is set at 1. The flow proceeds to the step 17. Step 17: An automatic focusing action is allowed to begin. The output of the output port P40 is produced at 1 to cause the automatic focusing device 12 to begin to operate. The automatic focusing device 12 performs a distance measuring action on the basis of an image signal obtained from the line sensor 8 and drives the photo-taking lens 2 according to the result of the distance measuring action. More specifically, if the image signal is deviating toward the nearest distance, the motor 13 is caused to rotate by turning the transistors 14 and 17 on. The photo-taking lens 2 is then shifted toward its infinity distance position. If the image signal is deviating toward the infinity distance, other transistors 15 and 16 are turned on to shift the photo-taking lens 2 toward the nearest distance position thereof. If the image signal indicates an in-focus state, the phototaking lens 2 is brought to a stop by turning all the transistors 14 to 16 off. The automatic focusing device 12 thus repeatedly performs the automatic focusing action to have the lens focused on the object to be photographed as long as the output level of the output port P40 is high. After attainment of the in-focus state, the output of the output port P40 is produced at 0 to bring the automatic focusing action to a stop. After that, the flow proceeds to a step 18.

Step 18: The output of the A/D converter 23 is read through the input port PORT1. When a current corresponding to the luminance of the object flows to the diode 20 and the operational amplifier 18, the current is converted by the diode 20 and the operational amplifier 18 into a logarithmically compressed voltage. The voltage is amplified by the resistors 21 and 22 and the operational amplifier 19. The amplified voltage is then supplied to the A/D converter 23. The A/D converter 23 then converts the voltage into a digital value. This digital value is supplied to the input port PORT1. The flow then proceeds to a step 19.

Step 19: The flag SCF is checked. The flow comes to a step 23 if the flag SCF is found to be at 0 or proceeds to a step 20 if the flag is found to be at 1. The flag SCF is arranged to be as shown in FIG. 19. Step 20: The flag AELKF is checked. The flow comes to a step 22 if the flag AELKF is found to be at 0 or proceeds to a step 21 is the flag is found to be at 1. The flag AELKF is arranged as shown in FIG. 19. Step 21: The flag CONTF is set at 1 if the single shooting mode is selected and at 0 if the continuous shooting mode is selected. The flow then proceeds to the step 22. The flag CONTF is arranged as shown in FIG. 19.

Step 22: The luminance value which is read at the step 18 is stored by a register disposed within the micom 11. The flow comes to a step 24. Step 23: The flag AELKF is checked. The flow comes to the step 22 if the flag is found to be at 0 or proceeds to a step 24 if the flag is found to be at 1. Step 24: The micom 11 obtains the Ev value of the object from the luminance value stored by its internal register and also from a film sensitivity (ISO) value set by a setting circuit which is not shown. The flow then proceeds to a step 25.

Step 25: A shutter speed is obtained from the Ev value and the aperture value. The flow proceeds to a step 26. Step 26: The aperture value and the shutter speed are displayed by the LCD display device. The flow proceeds to a step 27. Step 27: A check is made for the state of the switch 38 (SW2). The flow proceeds to a step 28 if the switch is found to be in an on-state or comes back to the step 3 if the switch is in an off-state.

Step 28: The flag SZENF is checked. The flow proceeds to a step 29 if the flag is at 0 or comes back to the step 3 if the flag is found to be at 1.

If the switch SWAE is kept in its off-state while the switch SW1 is in its on-state, the flag AELKF is at 0 under this condition. Therefore, in that case, the focusing, light measuring, exposure value computing and displaying actions are repeatedly performed with the steps repeatedly executed in the sequence of steps: 3 - 4 - 10 - 11 - 14 - 15 - 17 - 18 - 19 - 23 - 22 - 24 - 25 - 26 - 27 - 3. Further, if the switch SWAE is turned on with the button φ pushed down during this step repeating process, the flow is shifted to the steps 14 - 16 - 17 to have the flag AELKF set at 1. The flow is also shifted to the steps 19 - 23 - 24 to have the A/D converted value inhibited from being stored at the step 22. As a result, the A/D converted value is locked to a value corresponding to the measured light value output stored at the step 22 prior to the button φ is pushed down. The locked, converted value is used thereafter for the exposure value computation. An AE lock action is performed in this manner.

Further, when the release button is pushed to its second stroke position to turn on the switch SW2 during execution of the above-stated steps, the flow comes to a step 29 through the steps 27 and 28.

Step 29: The flag CONTF is checked. The flow proceeds to a step 30 if the flag is found to be at 1, thus indicating the continuous shooting mode, or comes to a step 31 if the flag is at 0 thus indicating the single shooting mode. Since the flag CONTF is set at 0 in this instance, the flow comes to the step 31.

Step 31: The flag SZENF is set at 1. The flow proceeds to a step 32. Step 32: The counter 26 is reset. The flow proceeds to a step 33. Step 33: The aperture value Av is produced from the output port PORT0. The flow proceeds to a step 34. Step 34: High level outputs are produced from the output ports P41 and P42. The transistors 33 and 34 are turned on to allow a current supply to the magnet 29 and 30. The magnet 29 then removes mechanical clamping which is not shown to allow the mirror 3 to be uplifted. The aperture is stopped down. The flow proceeds to a step 35. Step 35: After the lapse of 10 ms, the current supply to the magnet 29 is cut off. The flow proceeds to a step 36. Step 36: The flow waits for the completion of the process of stopping down the aperture. The aperture is arranged to be mechanically stopped down when the clamping is removed and the magnet 30 is energized. The switch 28 turns on and off once every time the aperture is stopped down by one step. This changes the count value of the counter 26. Since the counter 26 has been reset at the step 32, the on-off action of the switch 28 is counted one by one from zero. When the aperture is stopped down to a given value, the count value of the counter 26 reaches a given value to become equal to the output of the output port PRT0. Then, completion of control is detected. The flow proceeds to a step 37.

Step 37: The current supply to the magnet 30 is cut off by lowering the output level of the output port P42. When the magnetic 30 is thus turned off, a locking claw which is not shown comes to bring the aperture stopping down process to a stop. The flow proceeds to a step 38. Step 38: A check is made for the state of the switch 41 (SWMRUP). After completion of the mirror uplifting process, the flow proceeds to a step 39. Step 39: Real time is computed from the APEX value of the shutter time Tv. The computed real time value is set at the timer. The flow then proceeds to a step 40.

Step 40: The magnet 31 is energized to allow the leading shutter curtain to travel. The flow proceeds to a step 41. Step 41: After the lapse of the above stated real time as counted by the timer, the flow proceeds to a step 42. Step 42: The magnet 32 is energized to allow the trailing shutter curtain to travel. The flow proceeds to a step 43. Step 43: A check is made for the state of the switch 41 (SWMRUP). The flow waits until the mirror is moved down in association with the travel of the trailing shutter curtain. Step 44: The output of the port P47 is produced at 1. This actuates the motor 46 for film winding. After completion of film winding, the flow comes back to the step 3.

After the return of the flow of program to the step 3 with a sequence of photographing actions having been accomplished as mentioned above, if the switches SW1 and SW2 still remain in their on-states, the flow again proceeds to execute the steps in the sequence of steps 3 - 4 - 10 - 11 - 14 - 16 - 17 - 18 - 19 - 23 - 22 or 24 - 25 - 26 - 27 - 28. In this instance, since the flag SZENF has been set at 1 at the step 31 during the preceding round of photographing steps, the flow comes from the step 28 back to the step 3 to repeat the execution of the sequence of steps thereafter. In the case of the single shooting mode, therefore, photographing is not continuously performed even if the switch SW2 is kept in its on-state.

In case that the switch 40 (SWMF) is pushed down before photographing, the camera operates as follows:

In this case, the flow comes from the step 3 to a step 45. Step 45: The flag MFF is set at 1. Step 46: The timer is set at 10 seconds. Step 47: A check is made for the state of the flag MFF. The flow proceeds to a step 48 if the flag is found to be at 0 or comes to a step 51 if the flag is found to be at 1. Step 48: A check is made for the state of the switch 40 (SWMF). The flow proceeds to a step 49 if the switch is found on or comes to a step 53 if the switch is found off. Step 49: The flag SCF is checked. If the flag SCF is found to be at 0, the flag is inverted to 1. If the flag is found to be at 1, the flag is inverted to 0. The flow then proceeds to a step 50.

Step 50: The flag MFF is set at 1. The flow comes to the step 53. Step 51: A check is made for the state of the switch 40 (SWMF). The flow comes to the step 53 if the switch 40 is found on or comes to a step 52 if the switch is found off. Step 52: The flag is cleared to 0. The flow proceeds to the step 53. Step 53: The flag SCF is checked. The flow proceeds to a step 54 if the flag is at 0 or comes to a step 55 if the flag is at 1. Step 54: The LCD display device 25 displays "S" in the case of the single shooting mode or "C" if the camera is in the continuous shooting mode. The flow proceeds to a step 56. Step 55: The LCD display device 25 displays "SIC". The flow proceeds to the step 56.

Step 56: The timer is checked to see if the set period of 10 sec has elapsed. If not, the flow proceeds to a step 57. If so, the flow comes back to the step 4. Step 57: A check is made for the state of the switch 37 (SW1). The flow comes to the step 14 if the switch is found on or comes back to the step 47 if the switch is found off. If the switch SWMF is turned off after the flow is shifted from the step 3 to the step 45 by turning the switch SWMF on, the flow proceeds in the sequence of steps: 45 - 46 - 47 - 51 - 52 - 53 - 54 - 56 - 57 - 47. Then, in this instance, the flag MFF is set at 0 at the step 52. After that, if the switch SWMF is kept in its off-state, the flow repeats the round of steps 47 - 48 - 53 - 54 - 56 - 57 - 47. If the switch SWMF is again turned on from its off-state, the flow proceeds to execute steps in the sequence of 47 - 48 - 49 - 50. Then, at the step 49, the flag SCF is inverted from 0 to 1 and the flow proceeds from the step 50 to execute steps in the sequence of steps 53 - 55 - 56 - 57. Further, since the flag MFF is at 1 at the step 50, the sequence of steps 47 - 51 - 53 - 55 - 56 - 57 are repeatedly executed. Further, if the switch SWMF is turned off, the flow proceeds to execute steps in the sequence of steps 47 - 51 - 52 - 53 - 55 - 56 - 57. Then, at the step 52, the flag MFF is set at 0. Therefore, if the switch SWMF is kept in its off-state, the flow repeatedly executes the sequence of steps 47 - 48 - 53 - 55 - 56 - 57. With the switch SWMF turned on to bring the camera in the setting mode, the flag SCF thus can be inverted to set it at 1 by again turning the switch SWMF on. Further, after that, the flag SCF can be inverted and set at 0 by again turning the switch SWMF on. In other words, the flag SCF can be inverted and set at 1 or 0 as described by turning on the switch SWFM during execution of steps 47 to 57.

Next, when the flag SCF is set at 1 by operating the switch SWMF, the camera operates as follows: When the switch SW1 is turned on with the flag SCF in the state of being set at 1, the flow comes from the step 57 to the step 14. At the step 14: If the switch 39 (SWAE) found to be in its on-state, the flow comes to a step 16 to have the flag AELKF set at 1. Then, the flow proceeds to execute steps 17, 18, 19, 20 and 21. At the step 21: The flag CONTF is inverted.

In other words, the camera is set in the single shooting mode after the continuous shooting mode and set in the continuous shooting mode after the single shooting mode. If the flag CONTF is at 0, the flag is set at 1 at the step 21. After this, the shutter time value Tv and the aperture value Av are determined through steps 24, 25 and 26. Following that, the flow comes to a step 27. Step 27: A check is made for the state of the switch 37 (SW2). If the switch is found in its on-state, the flow proceeds via a step 28 to a step 29. Step 29: If the flag CONTF is found to be at 1, the flow comes to a step 30 to have the flag SZENF set at 0. After this, steps 31 to 44' are executed to have the sequence of photographing actions performed in the same manner as described in the foregoing. After that, the flow comes back to the step 3. At the step 3: If the switches SW1 and SW2 still remain in their on-states, the so-called continuous shooting operation is performed by repeatedly executing the sequence of steps: 3 - 4 - 10 - 11 - 15 - 30 - 32 - 44'.

Further, when the switch SWAE is turned on during the above stated process of continuous shooting, the flow shifts the above stated step repeating process to a sequence of steps 14 - 16 - 17 - 18 - 19 - 20 - 21 and the flag CONTF is again inverted to be at 0. As a result, the flow proceeds to execute a further sequence of steps 22 - 24 - 25 - 26 - 27 - 28 - 29 - 31. The flag SZENT is set at 1 by this. After that, photographing actions are performed through the steps 32 to 44'. The flow then comes to the step 28 again through the steps mentioned above. The flow comes back to the step 3 when the flag SZENF is found to be at 1 after the step 28. This means change-over from the continuous shooting mode to the single shooting mode.

As described above, with the flag SCF set at 1, the continuous shooting mode can be changed over to the single shooting mode by turning on the AE lock switch.

In the case of the embodiment described, the AE lock switch is used as a mode change-over switch. However, the camera may be arranged to effect the mode change-over by utilizing some other switch like a stopping down switch in place of the AE lock switch.

What is claimed is:

1. A camera or an accessory for said camera having first and second manual operation members, comprising:
   a) a mode setting circuit which is arranged such that, in a first mode, said circuit allows a first function or first information to be set by operating said first and second manual operation members together and allows a second function or second information to be set by operating said first manual operation member without operating said second manual operation member and, in a second mode, said circuit allows said second function or said second information to be set by operating said first and second manual operation members together and allows said first function or said first information to be set by operating said first manual operation member without operating said second manual operation member; and
   b) selection means for selecting the setting mode of said mode setting circuit.

2. A camera according to claim 1, wherein said first manual operation member is an operation dial.

3. A camera according to claim 1, wherein said first information is information on a shutter time value and said second information is information on an aperture value.

4. A camera according to claim 2, wherein said selection means is a third manual operation member.

5. A camera according to claim 2, wherein said first function is a first information setting action and said second function is a second information setting action.

6. A camera according to claim 4, wherein said first information is information pertaining to a shutter time value and said second information is information pertaining to an aperture value.

7. A camera or an accessory device for the camera having a plurality of manual operation members, comprising:
   a) control circuit which is arranged such that, in a first mode thereof, said circuit allows a first function or first information to be executed or set when said plurality of manual operation members are in a predetermined first operating state and allows a second function or second information to be executed or set when said plurality of manual operation members are in a predetermined second operating state which differs from said first operating state and, in a second mode thereof, said circuit allows said first function or information to be executed or set when said plurality of operation members are in said second operating state and allows said second function or information to be executed or set when said plurality of operation members are in said first operating state; and
   b) mode selection means for selecting the mode of said control circuit.

8. A camera or an accessory device for the camera having a first and second manual operation members, comprising:
   a) a control circuit for performing first and second functions by detecting operation conditions of said first and second manual operation members,
   said control circuit, in a first mode, performing said first function when a combination of said operation conditions of said first and second manual operation members is in a specific first combination condition and performing said second function when the combination is in a second specific combination condition different from said first specific combination condition, and in a second mode, performing said first function when the combination is in said second specific combination condition, and performing said second function when the combination is in said first specific combination condition; and
   b) selection means for selecting said modes of said circuit.

* * * * *

UNITED STATES PATENT AND TRADEMARK OFFICE
CERTIFICATE OF CORRECTION

PATENT NO. : 5,128,704

DATED : July 7, 1992

INVENTOR(S) : Hayashi et al.

It is certified that error appears in the above-identified patent and that said Letters Patent is hereby corrected as shown below:

In the Drawing:

SHEET 18 OF THE DRAWINGS:

In Fig. 20(b), "COMLETED?" should read --COMPLETED?--.

COLUMN 1:

Line 25, "linking" should read --liking--; and
Line 37, "that" should be deleted.

COLUMN 5:

Line 40, "b" should read --by--.

COLUMN 7:

Line 27, "t" should read --to--; and
Line 39, "above-state" should read --above-stated--.

COLUMN 10:

Line 5, "informatio" should read --information--.

COLUMN 11:

Line 17, "because: The" should read --because, the--;
Line 18, "that" should read --the--; and
Line 33, "comes" should read --come--.

COLUMN 12:

Line 62, "that" should be deleted.

UNITED STATES PATENT AND TRADEMARK OFFICE
CERTIFICATE OF CORRECTION

PATENT NO. : 5,128,704
DATED : July 7, 1992
INVENTOR(S) : Hayashi et al.

It is certified that error appears in the above-identified patent and that said Letters Patent is hereby corrected as shown below:

COLUMN 13:

Line 55, "zero" should read --zero.--.

COLUMN 15:

Line 30, "because: Since" should read --because, since--; and
Line 32, "of" should be deleted.

COLUMN 16:

Line 28, "is" should be deleted.

COLUMN 18:

Line 38, "because:" should read --because,--;
Line 39, "The" should read --the--; and
Line 50, "call" should read --can--.

COLUMN 19:

Line 13, "that" should be deleted.

COLUMN 22:

Line 44, "step 30." should read --step 130.--.

COLUMN 22:

Line 35, "instance," should read --instance.--

UNITED STATES PATENT AND TRADEMARK OFFICE
CERTIFICATE OF CORRECTION

PATENT NO. : 5,128,704
DATED : July 7, 1992
INVENTOR(S) : Hayashi et al.

It is certified that error appears in the above-identified patent and that said Letters Patent is hereby corrected as shown below:

COLUMN 23:

Line 18, "o" should read --of.--;
    Line 23, "RGTV" should read --RGTV.--;
    Line 27, "because:" should read --because,--;
    Line 28, "The" should read --the--; and
    Line 57, "display made" should read --display mode--.

COLUMN 24:

Line 17, "proceeds" should read --proceed--; and
    Line 22, "that" should be deleted.

COLUMN 26:

Line 13, "ever" should read --every--; and
    Line 30, "switch flag UPF." should read --switch is off.  Step 6:A check is made for the state of the flag UPF.--.

COLUMN 27:

Line 45, "is" (first occurrence) should be --if--.

UNITED STATES PATENT AND TRADEMARK OFFICE
CERTIFICATE OF CORRECTION

PATENT NO. : 5,128,704
DATED     : July 7, 1992
INVENTOR(S) : Hayashi et al.

It is certified that error appears in the above-identified patent and that said Letters Patent is hereby corrected as shown below:

COLUMN 29:

Line 30, "that" should be deleted.

COLUMN 30:

Line 16, "int he" should read --in the--;
   Line 27, "(SWAE)" should read --(SWAE) is--; and
   Line 51, "15-30" should read --15-17-18-19-20-22-24-
      25-26-27-28-29-30--.

COLUMN 31:

Line 4, "stopping" should read --stopping- --;
   Line 34, "claim 2" should read --claim 8,--; and
   Line 36, "claim 2" should read --claim 8,--.

Signed and Sealed this

Twenty-eighth Day of December, 1993

Attest:

BRUCE LEHMAN

*Attesting Officer*    *Commissioner of Patents and Trademarks*